(12) United States Patent
Takagi et al.

(10) Patent No.: US 12,368,392 B2
(45) Date of Patent: Jul. 22, 2025

(54) ELECTRIC-POWER CONVERSION APPARATUS

(71) Applicant: Mitsubishi Electric Corporation, Tokyo (JP)

(72) Inventors: Toshikazu Takagi, Tokyo (JP); Chiharu Morisaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 252 days.

(21) Appl. No.: 18/203,421

(22) Filed: May 30, 2023

(65) Prior Publication Data

US 2024/0136950 A1 Apr. 25, 2024
US 2024/0235427 A9 Jul. 11, 2024

(30) Foreign Application Priority Data

Oct. 19, 2022 (JP) .................................. 2022-167528

(51) Int. Cl.
| | | |
|---|---|---|
| *H02M 7/5387* | (2007.01) | |
| *B60L 50/51* | (2019.01) | |
| *H02M 1/00* | (2006.01) | |
| *H02M 1/088* | (2006.01) | |

(52) U.S. Cl.
CPC ......... *H02M 7/53873* (2013.01); *B60L 50/51* (2019.02); *H02M 1/0009* (2021.05); *H02M 1/088* (2013.01); *B60L 2210/44* (2013.01)

(58) Field of Classification Search
CPC ......... H02M 7/53873; H02M 7/53875; H02M 7/53876; H02M 7/53878; H02M 7/5388; H02M 7/5387; H02M 7/53871; H02M 1/0009; H02M 1/088; H02M 1/096; H02M 1/0845; H02M 1/084; B60L 50/51
See application file for complete search history.

(56) References Cited

U.S. PATENT DOCUMENTS

| | | | | |
|---|---|---|---|---|
| 2011/0074364 A1* | 3/2011 | Nakajima | ............... | H02M 1/32 322/19 |
| 2011/0278918 A1* | 11/2011 | Shindo | ...................... | B60L 3/04 361/18 |
| 2016/0036316 A1* | 2/2016 | Momota | ............ | H03K 17/0828 363/78 |

FOREIGN PATENT DOCUMENTS

JP    2020-065341 A    4/2020

* cited by examiner

*Primary Examiner* — Nguyen Tran
(74) *Attorney, Agent, or Firm* — Sughrue Mion, PLLC

(57) ABSTRACT

An electric-power conversion apparatus includes a driving circuit that performs switching control of semiconductor switching devices, a short-circuit control means that performs short-circuit control of an electric-power conversion circuit, an excessive-current detection means that detects whether or not an abnormality caused by an excessive current exists in the semiconductor switching device, and a gate-drive-abnormality detection means that detects whether or not an abnormality exists in a gate voltage of the semiconductor switching device; based on a result of the abnormality detection by the excessive-current detection means and a result of the abnormality detection by the gate-drive-abnormality detection means, the short-circuit control means turns on all the semiconductor switching devices in any one of the upper arm and the lower arm so as to perform the short-circuit control.

16 Claims, 9 Drawing Sheets

FIG.4

| SHORT-CIRCUIT CONTROL SIGNAL | | GATE VOLTAGES FROM RESPECTIVE DRIVING CIRCUITS | | GATE CONTROL |
|---|---|---|---|---|
| ASC1 | ASC2 | UPPER ARM | LOWER ARM | |
| L | L | Lo | Lo | ALL PHASES SHUT OFF |
| L | H | Lo | Hi | 3-PHASE LOWER-ARM SHORT-CIRCUIT CONTROL |
| H | L | Hi | Lo | 3-PHASE UPPER-ARM SHORT-CIRCUIT CONTROL |
| H | H | EFFECTIVE INPUT SIGNAL | EFFECTIVE INPUT SIGNAL | PWM CONTROL BY MICON |

H : NORMAL,  L : ABNORMAL

FIG.9

| | INPUT SIGNALS TO LOGIC CIRCUIT UNIT | | | | FAIL-SAFE OPERATION | |
|---|---|---|---|---|---|---|
| | a | b | c | d | | |
| (1) | H | H | H | H | NORMAL DRIVING | ⇐ ASC1=H, ASC2=H |
| (2) | L | H | H | H | LOWER-ARM SHORT-CIRCUIT CONTROL | ⇐ ASC1=L, ASC2=H |
| | H | H | H | L | | |
| | L | H | H | L | | |
| | L | H | L | L | | |
| | H | H | L | L | | |
| | L | H | L | H | | |
| (3) | H | H | L | H | UPPER-ARM SHORT-CIRCUIT CONTROL | ⇐ ASC1=H, ASC2=L |
| | H | L | H | H | | |
| | L | L | H | H | | |
| | L | L | L | H | | |
| | H | L | L | H | | |
| (4) | H | L | H | L | ALL-PHASE SHUTOFF CONTROL | ⇐ ASC1=L, ASC2=L |
| | H | L | L | L | | |
| | L | L | H | L | | |
| | L | L | L | L | | |

H : NORMAL, L : ABNORMAL

↑ OUTPUT SIGNALS OF LOGIC CIRCUIT UNIT

ELECTRIC-POWER CONVERSION APPARATUS

BACKGROUND OF THE INVENTION

Field of the Invention

The present disclosure relates to an electric-power conversion apparatus.

Description of the Related Art

To date, electric automobiles whose driving-force sources are AC motors have been known. When an electric automobile travels, the AC motor is operated in a power-running mode so that traveling drive torque is generated so as to drive the electric automobile; when the electric automobile is in a braking mode, the AC motor is operated in a regenerative mode so that regenerative braking torque is generated. The driving system of such an electric automobile has a DC power source formed of a secondary battery such as a lithium ion battery, an electric-power conversion apparatus including a capacitor and two or more semiconductor switching devices, and an AC motor as a load to be connected with the electric-power conversion apparatus.

When the AC motor is operated in the power-running mode, the electric-power conversion apparatus in the electric automobile operates as an inverter for converting DC electric power into AC electric power; the two or more semiconductor switching devices are switching-controlled with a predetermined switching frequency, so that DC electric power is converted into predetermined AC electric power and is supplied to the AC motor. The AC motor is operated in the power-running mode, based on the AC electric power to be supplied from the inverter, and the torque, the rotation speed, and the like thereof are controlled; as a result, the AC motor drives the electric automobile.

In contrast, when the AC motor is operated in the regenerative mode, the electric-power conversion apparatus operates as a converter for converting AC electric power into DC electric power; the two or more semiconductor switching devices in the electric-power conversion apparatus are switching-controlled with a predetermined switching frequency, so that AC electric power generated through the regenerative operation of the AC motor is converted into predetermined DC electric power and is supplied to the DC power source.

In general, as the AC motor to be utilized in an electric automobile, permanent-magnet-type three-phase synchronous motor having a high operational efficiency is utilized. In the driving system of an electric automobile utilizing a three-phase synchronous motor, the electric-power conversion apparatus has three respective series circuits in each of which an upper-arm semiconductor switching device and a lower-arm semiconductor switching device are connected in series with each other and that correspond to an U-phase, a V-phase, and a W-phase; then, the electric-power conversion apparatus is formed of a three-phase bridge circuit in which these series circuits are each connected in parallel with the DC power source. The connection point between the upper-arm semiconductor switching device and the lower-arm semiconductor switching device, as the middle point of each of the three series circuits in the electric-power conversion apparatus, is connected with each corresponding one of the U-phase, V-phase, and W-phase armature windings of the three-phase synchronous motor.

In the electric-power conversion apparatus configured as described above, the upper-arm semiconductor switching devices and the lower-arm semiconductor switching devices provided corresponding to the U-phase, the V-phase, and the W-phase are switching-controlled at predetermined timings, so that the U-phase, V-phase, and W-phase armature windings of the three-phase synchronous motor are supplied with AC electric powers in which a phase difference of an electric angel 120° exists among one another and hence the three-phase synchronous motor is driven.

In order to protect a battery as the DC power source from an excessive voltage or an excessive current, the driving system of an electric automobile is provided with an opening/closing means for disconnecting the battery from the electric-power conversion apparatus, as may be necessary. The opening condition for the opening/closing means is a case where while the AC motor is operated in the regenerative mode, the voltage of the battery becomes the same as or higher than predetermined value, a case where due to exhaustion of the battery, the battery voltage becomes the same as or lower than a predetermined value, a case where the current flowing in the battery becomes the same as or larger than a predetermined value, or the like. In addition, there may be a case where due to failure in a vehicle or collision of a vehicle, the foregoing opening/closing means is opened.

However, foregoing conventional technology has the following problem: in the case where when fail-safe operation through three-phase short-circuit control is performed while all the U-phase, V-phase, and W-phase upper-arm or lower-arm semiconductor switching devices of the electric-power conversion apparatus are turned on, there has been caused an abnormality such as short-circuit fixation or opening fixation in the semiconductor switching device of the arm opposite to the arm whose semiconductor switching device is turned on, the three-phase short-circuit control cannot be performed.

In other words, in the case where when in an inverter as the electric-power conversion apparatus, three-phase short-circuit control is performed while the upper-arm or the lower-arm semiconductor switching devices of the all phases are turned on, there has been caused an abnormality such as short-circuit fixation or opening fixation in the semiconductor switching device of the arm opposite to the arm whose semiconductor switching device is turned on, short-circuiting between the upper arm and the lower arm is caused, for example, and results in a secondary failure. Accordingly, even when a failure is caused in the semiconductor switching device in any of the arms of the electric-power conversion apparatus, it is required to securely perform the three-phase short-circuit control, especially in consideration of driver protection measures for an emergency such as a vehicle collision.

In the foregoing electric-automobile driving system, there may be a case where while the AC motor is operated in the regenerative mode, the foregoing opening/closing means is opened and hence the DC power source is disconnected from the electric-power conversion apparatus. Moreover, even in the case of a system having no opening/closing means, there may be a case where the power line between the DC power source and the electric-power conversion apparatus is broken and hence the electric-power conversion apparatus is disconnected from the DC power source. Furthermore, when in an electric-automobile driving system, an external contributing factor forcibly drives the rotor of the AC motor, the battery cannot be charged with regenerative electric power that flows into the inverter from the AC motor and hence the vehicle behavior may be disturbed due to accompanying rotation of the AC motor, occurrence of unnecessary torque, or the like.

To date, in order to protect a driver by preventing disturbance in the vehicle behavior, caused by accompanying rotation of the AC motor, occurrence of unnecessary torque, or the like, there has been performed so-called fail-safe operation in which three-phase short-circuit control of the electric-power conversion apparatus is performed and hence the rotation speed of the AC motor is decreased so that the voltage of the DC power source connected with the electric-power conversion apparatus is lowered to a normal value. However, as described above, when the fail-safe operation trough the three-phase short-circuit control is performed, it is required to determine whether or not short-circuit fixation opening fixation exists in the semiconductor switching device.

In addition, to date, as an excessive-current detection means or an excessive-current protection means in the electric-power conversion apparatus, there has been a DESAT, an OC, or the like provided in a driving circuit for driving the semiconductor switching device. The DESAT is a function in which the semiconductor switching device is protected by detecting an excessive current caused by short-circuiting or the like in the semiconductor switching device and then shutting off the gate voltage; the OC is a function in which an excessive current is detected and the circuit is disconnected. However, the excessive-current detection means such as the DESAT, the OC, or the like shuts off the gate voltage of the semiconductor switching device by instantaneously detecting an excessive current caused by short-circuiting or the like, short-circuit fixation or opening fixation in the semiconductor switching device could have hardly been determined.

Accordingly, in the case of the abnormality detection function such as the DESAT, the OC, or the like, although it is made possible to localize the leg (a series circuit of the upper arm and the lower arm) in which an abnormality has occurred, it is not made possible to determine whether the abnormality is in the upper arm or in the lower arm. Moreover, it has not been made possible to determine whether the abnormality is a temporary one or a one having continuity, such as short-circuit fixation or opening fixation in the semiconductor switching device.

Furthermore, although another abnormality detection means in the driving circuit for the semiconductor switching device, for example, a gate-voltage-abnormality monitoring function formed of a gate-drive-abnormality detection means can also detect whether or not the gate voltage is abnormal, it has not been made possible to determine whether the subject semiconductor switching device has short-circuit fixation or opening fixation.

Thus, in the driving system for a permanent-magnet-type synchronous motor disclosed in Patent Document 1, it is proposed that a control apparatus that generates a driving signal for driving semiconductor switching devices included in an inverter should have a first function for detecting an abnormality in the inverter, a second function for detecting output currents of respective phases in the inverter, and a third function in which in order to short-circuiting the stator winding of the permanent-magnet-type synchronous motor at a time when the first function detects an abnormality, there is generated a driving signal for turning on the upper-arm or the lower-arm semiconductor switching devices of the all phases so as to perform short-circuit control while avoiding short-circuiting between the upper arm and the lower arm of the inverter, in accordance with a balance state among the output currents of the respective phases detected by the second function.

According to Patent Document 1, as represented in FIG. 3 thereof, in order to prevent a secondary failure, such as short-circuiting between the upper arm and the lower arm, during the short-circuit control, it is sequentially ascertained, based on the balance state among the output currents of the respective phases, whether or not there exists an abnormality caused by short-circuit fixation or opening fixation in the upper-arm semiconductor switching device and the lower-arm semiconductor switching device; then, while localizing the generation position of an abnormality such as short-circuit failure or open failure in the semiconductor switching devices included in the inverter, short-circuit control of the windings of the synchronous motor is performed, so that an evading action through fail-safe operation is taken.

According to the conventional technology disclosed in Patent Document 1, in order to realize the determination on an abnormality, such as short-circuit fixation or opening fixation, represented in FIG. 3 thereof, software processing by a MICON or the like is required. However, when a vehicle is made to quickly transit to an evading-drive state, it is required to rapidly perform transition to a fail-safe state while evading a secondary failure caused, for example, by short-circuiting between the upper arm and the lower arm of the inverter as an electric-power conversion apparatus; thus, in the case where as in the technology disclosed in Patent Document 1, the three-phase short-circuit control is performed through software processing by a MICON, there has been a problem that the transition from detection of the occurrence of an abnormality to the fail-safe state is delayed.

In particular, in the conventional technology disclosed in Patent Document 1, because the determination on an abnormality such as short-circuit fixation or opening fixation cannot be performed without observing the currents of the respective phases for a while, there has been a problem that it takes a long time to control the inverter so as to make the vehicle transit to the evading-drive state.

Moreover, conventional technology disclosed in Patent Document 1, because at a time of system designing, it is required to include the transition time in which an abnormality is detected and then the vehicle is made to transit to the evading-drive state, a trade-off between the cost and the responsiveness takes place. For example, because at a time of the three-phase short-circuit control, the phase current is gradually offset, it is required to perform designing for upsizing the shape of a bus bar including the offset portion of the phase current, or in order to improve the responsiveness, it is required to add a dedicated MICON for the three-phase short-circuit control; as a result, the cost of the product is raised.

In addition, in the conventional technology disclosed in Patent Document 1, because the response time from localization of the position of short-circuit fixation or opening fixation in the upper-arm or the lower-arm semiconductor switching device to the fail-safe operation is long, it is required to expand, also in terms of the product performance, the current-sensor observation range, in consideration of the offset caused by an imbalance among the phase currents

PRIOR ART REFERENCE

Patent Document

[Patent Document 1] Japanese Patent Application Laid-Open No. 2020-65341

SUMMARY OF THE INVENTION

The present disclosure is to disclose a technology for solving the foregoing problems; the objective thereof is to provide an electric-power conversion apparatus that realizes control for rapidly coping with an abnormality, even when the abnormality occurs in an electric-power conversion circuit.

An electric-power conversion apparatus disclosed in the present disclosure includes an electric-power conversion circuit in which two or more series circuits in each of which an upper-arm semiconductor switching device and a lower-arm semiconductor switching device are connected in series with each other are connected in parallel with one another, parallel connection portions of the two or more series circuits are connected with a DC power source, a series connection portion between the upper-arm semiconductor switching device and the lower-arm semiconductor switching device in each of the two or more series circuits is connected with an armature winding of an AC motor, and electric-power conversion between the DC power source and the AC motor is performed through switching control of the respective upper-arm semiconductor switching devices and lower-arm semiconductor switching devices in the two or more series circuits, a driving circuit that provides gate driving signals to the upper-arm semiconductor switching device and the lower-arm semiconductor switching device so as to perform the switching control, a short-circuit control means that performs short-circuit control of the electric-power conversion circuit by turning on all the semiconductor switching devices in any one of the upper arm and the lower arm, an excessive-current detection means that detects whether or not an abnormality caused by an excessive current exists in the upper-arm semiconductor switching device and/or the lower-arm semiconductor switching device, and a gate-drive-abnormality detection means that detects whether or not a gate-voltage abnormality exists in the upper-arm semiconductor switching device and/or the lower-arm semiconductor switching device; the electric-power conversion apparatus is characterized in that based on a result of the abnormality detection by the excessive-current detection means and a result of the abnormality detection by the gate-drive-abnormality detection means, the short-circuit control means turns on all the semiconductor switching devices in any one of the upper arm and the lower arm so as to perform the short-circuit control.

The present disclosure makes it possible to obtain an electric-power conversion apparatus that realizes control for rapidly coping with an abnormality, even when the abnormality occurs in an electric-power conversion circuit.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 4 is an explanatory table representing the relationship among output signals of a logic circuit unit, a gate voltage, and gate control in the electric-power conversion apparatus according to Embodiment 1;

FIG. 9 is an explanatory table representing the relationship among input signals of the logic circuit unit, output signals thereof, and the gate control in the electric-power conversion apparatus according to Embodiment 1.

DETAILED DESCRIPTION OF THE PREFERRED EMBODIMENTS

Figure 1:
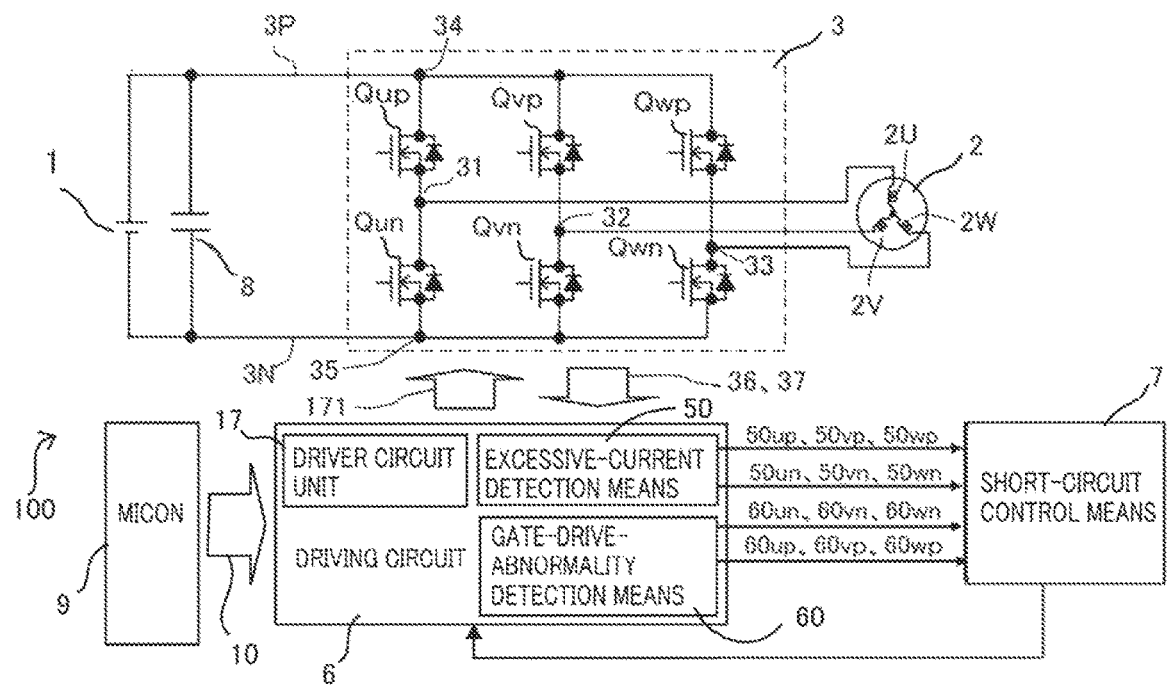
FIG. 1 is a configuration diagram representing the overall configuration of an electric-power conversion apparatus according to Embodiment 1.

Hereinafter, an electric-power conversion apparatus according to Embodiment 1 will be explained based on the drawings. In the following explanations, the same or similar constituent members and elements are designated by the same reference numerals. In an electric-power conversion apparatus according to Embodiment 1, an electric-power conversion circuit drives, for example, a permanent magnet-type three-phase synchronous motor, as the AC motor for driving an electric automobile; in the following explanation, a permanent-magnet-type three-phase synchronous motor will simply be referred to as an AC motor.

Embodiment 1

FIG. 1 is a configuration diagram representing the overall configuration of an electric-power conversion apparatus according to Embodiment 1. In FIG. 1, an electric-power conversion apparatus 100 has an electric-power conversion circuit 3, a driving circuit 6, a short-circuit control means 7, an excessive-current detection means 50, a gate-drive-abnormality detection means 60, a microprocessor (hereinafter, referred to as a MICON) 9, and a smoothing capacitor 8 as a power storage circuit.

The smoothing capacitor 8 is formed of a film capacitor or the like. The application thereof is to store electric power supplied from a DC power source 1 and to smooth the voltage and the current by suppressing ripples caused due to inverter operation of the electric-power conversion circuit 3. In addition, the smoothing capacitor 8 temporarily stores regenerative energy generated by the AC motor 2 and charges the DC power source 1 with the regenerative energy.

The electric-power conversion circuit 3 is connected between the DC power source 1 and the AC motor 2. The electric-power conversion circuit 3 is formed of a three-phase bridge circuit and includes a U-phase upper-arm semiconductor switching device Qup, a U-phase lower-arm semiconductor switching device Qun, a V-phase upper-arm semiconductor switching device Qvp, a V-phase lower-arm semiconductor switching device Qvn, a W-phase upper-arm semiconductor switching device Qwp, and a W-phase lower-arm semiconductor switching device Qwn.

Each of the semiconductor switching devices Qup, Qun, Qvp, Qvn, Qwp, and Qwn is formed of a wide-gap semiconductor such as a MOSFET (Metal oxide Semiconductor Field Effect Transistor), IGBT (Insulated Gate Bipolar Transistor), SiC-MOSFET (Silicon Carbide MOSFET), GaN (gallium nitride), or the like.

The U-phase upper-arm semiconductor switching device Qup and the U-phase lower-arm semiconductor switching device Qun are connected in series with each other by a series connection portion 31 so as to form a U-phase series circuit; the V-phase upper-arm semiconductor switching device Qvp and the V-phase lower-arm semiconductor switching device Qvn are connected in series with each other by a series connection portion 32 so as to form a V-phase series circuit; the W-phase upper-arm semiconductor switching device Qwp and the W-phase lower-arm semiconductor switching device Own are connected in series with each other by a series connection portion 33 so as to form a W-phase series circuit.

The U-phase series circuit, the V-phase series circuit, and the W-phase series circuit are connected in parallel with one another; a positive-polarity terminal 3P of the electric-power conversion circuit 3 is connected with one parallel connection portion 34, and a negative-polarity terminal 3N of the electric-power conversion circuit 3 is connected with the other parallel connection portion 35. The positive-polarity terminal 3P is connected with the positive electrode of the DC power source 1, and the negative-polarity terminal 3N is connected with the negative electrode of the DC power source 1. The smoothing capacitor 8 as a power storage circuit is connected between the positive-polarity terminal 3P and the negative-polarity terminal 3N of the electric-power conversion circuit 3. The DC power source 1 is formed of a high-voltage lithium ion battery or the like mounted in an electric automobile and applies a DC voltage of substantially 200 [V] to 800 [V] across the positive-polarity terminal 3P and the negative-polarity terminal 3N.

In the electric-power conversion circuit 3, the series connection portion 31 between the U-phase upper-arm semiconductor switching device Qup and the U-phase lower-arm semiconductor switching device Qun is connected with a U-phase armature winding 2U of the AC motor 2; the series connection portion 32 between the V-phase upper-arm semiconductor switching device Qvp and the V-phase lower-arm semiconductor switching device Qvn is connected with a V-phase armature winding 2V of the AC motor 2; the series connection portion 33 between the W-phase upper-arm semiconductor switching device Qwp and the W-phase lower-arm semiconductor switching device Qwn is connected with a W-phase armature winding 2W of the AC motor 2.

Based on PWM control signals 10 inputted from the MICON 9, driver circuit units 17 provided in the driving circuit 6 each generate gate driving signals 171 and provide the gate driving signals 171 to the respective gates of the semiconductor switching devices Qup, Qun, Qvp, Qvn, Qwp, and Qwn of the electric-power conversion circuit 3 so as to switching-control the semiconductor switching devices Qup, Qun, Qvp, Qvn, Qwp, and Qwn.

The driver circuit unit 17 in the driving circuit 6 has an insulation function and turns on or off the semiconductor switching device of the subject arm in accordance with the H-level (high level) state or the L-level (low level) state of the PWM control signal 10 as the input signal to the driving circuit 6, from the lower side, which is the side of the reference electric potential of the MICON 9 and a low-voltage power source of 12 [V] generated by a step-down converter from a low-voltage-system lead battery or a high-voltage battery, as an unillustrated second power source.

In other words, when the PWM control signal 10 is H-level, the driving circuit 6 turns on the semiconductor switching device; when the PWM control signal 10 is Lo, the driving circuit 6 turns off the semiconductor switching device.

The semiconductor switching devices Qup, Qun, Qvp, Qvn, Qwp, and Qwn are switching-controlled through PWM control, based on the gate driving signals 171, so as to each perform electric-power conversion between the DC power source 1 and the corresponding one of the armature windings 2U, 2V, and 2W of the respective phased of the AC motor 2.

When the AC motor 2 is operated in the power-running mode, the electric-power conversion circuit 3 is made to operate as an inverter and supplies the U-phase, V-phase, and W-phase armature windings of the AC motor 2 with AC electric powers in which a phase difference of an electric angle 120° exists among one another. When the AC motor 2 is operated in the regenerative mode, the electric-power conversion circuit 3 is made to operate as a converter, converts the AC electric powers that are generated in the U-phase, V-phase, and W-phase armature windings of the AC motor 2 and in which a phase difference of an electric angle 120° exists among the armature windings into DC electric powers, and then supplies the DC electric powers to the DC power source 1 by way of the smoothing capacitor 8.

In addition, the driving circuit 6 has the excessive-current detection means 50 and the gate-drive-abnormality detection means 60. As the excessive-current detection means 50, a DESAT (unsaturated) detection unit is utilized in the present embodiment; the output of the DESAT detection unit will be referred to as a DESAT signal. Based on a DESAT signal 36 from each of the semiconductor switching devices Qup, Qun, Qvp, Qvn, Qwp, and Qwn, the excessive-current detection means 50 detects an abnormality caused by an excessive current in each of the semiconductor switching devices Qup, Qun, Qvp, Qvn, Qwp, and Own.

That is to say, based on the DESAT signal 36, the excessive-current detection means 50 outputs a U-phase upper-arm excessive-current-abnormality detection signal 50*up*, when detecting an abnormality caused by an excessive current in the U-phase upper-arm semiconductor switching device Qup; the excessive-current detection means 50 outputs a V-phase upper-arm excessive-current-abnormality detection signal 50vp, when detecting an abnormality caused by an excessive current in the V-phase upper-arm semiconductor switching device Qvp; the excessive-current detection means 50 outputs a W-phase upper-arm excessive-current-abnormality detection signal 50wp, when detecting an abnormality caused by an excessive current in the W-phase upper-arm semiconductor switching device Qwp.

In addition, based on the DESAT signal 36, the excessive-current detection means 50 outputs U-phase lower-arm excessive-current-abnormality detection signal 50un, when detecting an abnormality caused by an excessive current in the U-phase lower-arm semiconductor switching device Qup; the excessive-current detection means 50 outputs a V-phase lower-arm excessive-current-abnormality detection signal 50vn, when detecting an abnormality caused by an excessive current in the V-phase lower-arm semiconductor switching device Qvn; the excessive-current detection means 50 outputs a W-phase lower-arm excessive-current-abnormality detection signal 50wn, when detecting an abnormality caused by an excessive current in the W-phase lower-arm semiconductor switching device Own.

Based on a gate voltage detection signal 37 from an after-mentioned gate voltage monitoring unit for monitoring the gate voltage of each corresponding one of the semiconductor switching devices Qup, Qun, Qvp, Qvn, Qwp, and Own, the gate-drive-abnormality detection means 60 detects an abnormality in the gate voltage of each corresponding one of the semiconductor switching devices Qup, Qun, Qvp, Qvn, Qwp, and Own.

Based on the gate voltage detection signal 37, the gate-drive-abnormality detection means 60 outputs a U-phase upper-arm gate-drive-abnormality detection signal 60up, when detecting an abnormality in the gate voltage of the U-phase upper-arm semiconductor switching device Qup; the gate-drive-abnormality detection means 60 outputs a V-phase upper-arm gate-drive-abnormality detection signal 60vp, when detecting an abnormality in the gate voltage of the V-phase upper-arm semiconductor switching device Qvp; the gate-drive-abnormality detection means 60 outputs a W-phase upper-arm gate-drive-abnormality detection signal 60wp, when detecting an abnormality in the gate voltage of the W-phase upper-arm semiconductor switching device Qwp.

In addition, based on the gate voltage detection signal 37, the gate-drive-abnormality detection means 60 outputs a U-phase lower-arm gate-drive-abnormality detection signal 60un, when detecting an abnormality in the gate voltage of the U-phase lower-arm semiconductor switching device Qun; the gate-drive-abnormality detection means 60 outputs a V-phase lower-arm gate-drive-abnormality detection signal 60vn, when detecting an abnormality in the gate voltage of the V-phase lower-arm semiconductor switching device Qvn; the gate-drive-abnormality detection means 60 outputs a W-phase lower-arm gate-drive-abnormality detection signal 60wn, when detecting an abnormality in the gate voltage of the W-phase lower-arm semiconductor switching device Qwn.

In Embodiment 1, the short-circuit control means 7 is formed of an ASC (Active Short Circuit) and receives the U-phase upper-arm excessive-current-abnormality detection signal 50up, the V-phase upper-arm excessive-current-abnormality detection signal 50vp, the W-phase upper-arm excessive-current-abnormality detection signal 50wp, the U-phase lower-arm excessive-current-abnormality detection signal 50un, the V-phase lower-arm excessive-current-abnormality detection signal 50vn, and the W-phase lower-arm excessive-current-abnormality detection signal 50wn from the excessive-current detection means 50.

In addition, the short-circuit control means 7 receives the U-phase upper-arm gate-drive-abnormality detection signal 60up, the V-phase upper-arm gate-drive-abnormality detection signal 60vp, the W-phase upper-arm gate-drive-abnormality detection signal 60wp, the U-phase lower-arm gate-drive-abnormality detection signal 60un, the V-phase lower-arm gate-drive-abnormality detection signal 60vn, and the W-phase lower-arm gate-drive-abnormality detection signal 60wn from the gate-drive-abnormality detection means 60.

As described later, based on the excessive-current-abnormality detection signal from the excessive-current detection means 50 and the gate-drive-abnormality detection signal from the gate-drive-abnormality detection means 60, the short-circuit control means 7 determines which one of the upper-arm semiconductor switching device and the lower-arm semiconductor switching device in the electric-power conversion circuit 3 is turned on for performing the short-circuit control; based on the determination, the short-circuit control of the electric-power conversion circuit 3 is performed.

Figure 2:
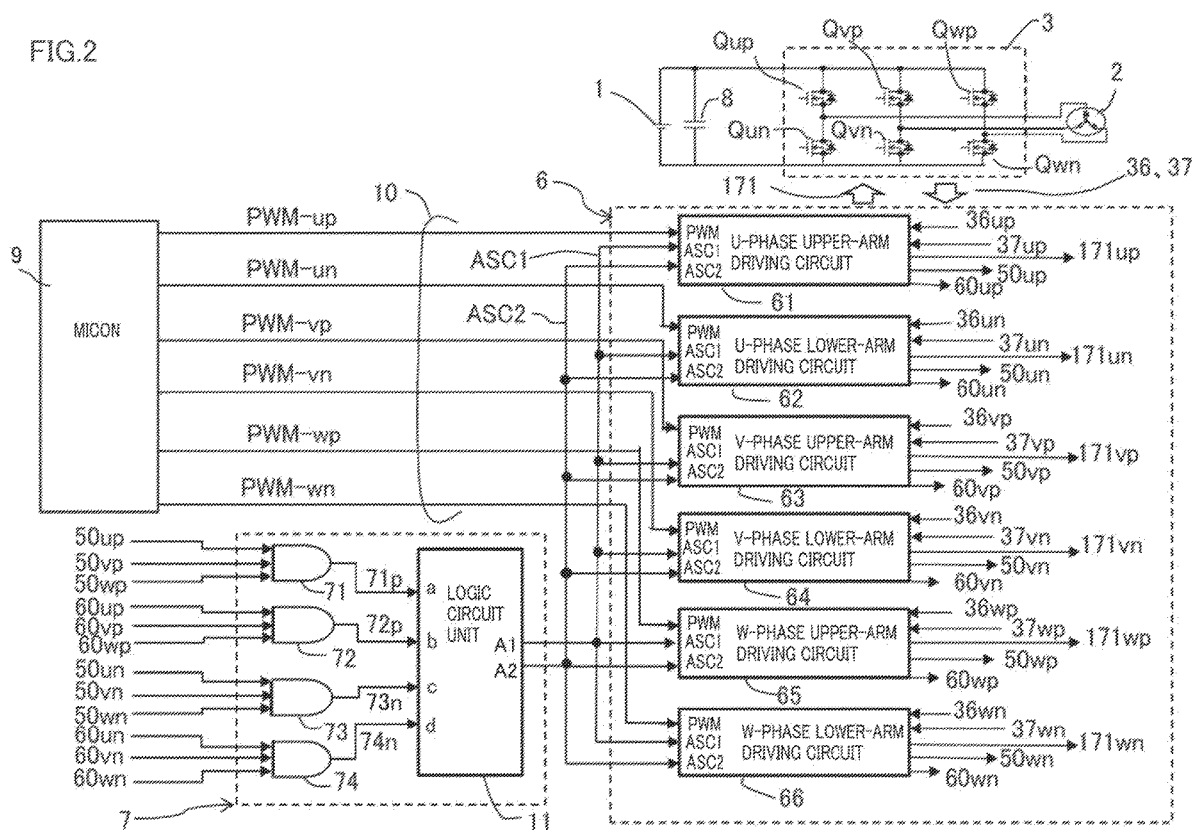
FIG. 2 is a configuration diagram representing part of the configuration of the electric-power conversion apparatus according to Embodiment 1.

Next, the details of the respective configurations of the driving circuit 6 and the short-circuit control means 7 will be explained. FIG. 2 is a configuration diagram representing part of the configuration of the electric-power conversion apparatus according to Embodiment 1; FIG. 2 represents the details of the respective configurations of the driving circuit 6 and the short-circuit control means 7.

In FIG. 2, the DESAT signal 36 a generic name including a U-phase upper-arm DESAT signal 36up, a U-phase lower-arm DESAT signal 36un, a V-phase upper-arm DESAT signal 36vp, a V-phase lower-arm DESAT signal 36vn, a W-phase upper-arm DESAT signal 36wp, and a W-phase lower-arm DESAT signal 36wn.

The gate voltage detection signal 37 is a generic name including a U-phase upper-arm gate voltage detection signal 37up, a U-phase lower-arm gate voltage detection signal 37un, a V-phase upper-arm gate voltage detection signal 37vp, a V-phase lower-arm gate voltage detection signal 37vn, a W-phase upper-arm gate voltage detection signal 37wp, and a W-phase lower-arm gate voltage detection signal 37wn.

In addition, the gate driving signal 171 is a generic name including a U-phase upper-arm gate driving signal 171up, a U-phase lower-arm gate driving signal 171un, a V-phase upper-arm gate driving signal 171vp, a V-phase lower-arm gate driving signal 171vn, a W-phase upper-arm gate driving signal 171wp, and a W-phase lower-arm gate driving signal 171wn.

Moreover, the PWM control signal 10 is a generic name including a U-phase upper-arm PWM control signal PWM-up, a U-phase lower-arm PWM control signal PWM-un, a V-phase upper-arm PWM control signal PWM-vp, a V-phase lower-arm PWM control signal PWM-vn, a W-phase upper-arm PWM control signal PWM-wp, and a W-phase lower-arm PWM control signal PWM-wn.

The driving circuit 6 includes a U-phase upper-arm driving circuit 61, a U-phase lower-arm driving circuit 62, a V-phase upper-arm driving circuit 63, a V-phase lower-arm driving circuit 64, a W-phase upper-arm driving circuit 65, and a W-phase lower-arm driving circuit 66; each of the driving circuits is provided with the driver circuit unit 17, the excessive-current detection means 50, and the gate-drive-abnormality detection means 60.

Each of the U-phase upper-arm driving circuit 61, the U-phase lower-arm driving circuit 62, the V-phase upper-arm driving circuit 63, the V-phase lower-arm driving circuit 64, the W-phase upper-arm driving circuit 65, and the W-phase lower-arm driving circuit 66 is provided with a PWM input portion to which the PWM control signal 10 is inputted, an ASC1 input portion to which an after-mentioned first ASC signal ASC1 from the short-circuit control means 7 is inputted, and an ASC2 input portion to which an after-mentioned second ASC signal ASC2 from the short-circuit control means 7 is inputted.

Based on the U-phase upper-arm PWM control signal PWM-up inputted from the MICON 9 to the PWM input portion, the U-phase upper-arm driving circuit 61 generates the U-phase upper-arm gate driving signal 171$up$ and provides the U-phase upper-arm gate driving signal 171$up$ to the gate of the U-phase upper-arm semiconductor switching device Qup of the electric-power conversion circuit 3. Based on the U-phase lower-arm PWM control signal PWM-un inputted from the MICON 9 to the PWM input portion, the U-phase lower-arm driving circuit 62 generates the U-phase lower-arm gate driving signal 171$un$ and provides the U-phase lower-arm gate driving signal 171$un$ to the gate of the U-phase lower-arm semiconductor switching device Qun of the electric-power conversion circuit 3.

In addition, the U-phase upper-arm driving circuit 61 outputs the U-phase upper-arm excessive-current-abnormality detection signal 50$up$, based on the inputted U-phase upper-arm DESAT signal 36$up$, and outputs the U-phase upper-arm gate-drive-abnormality detection signal 60$up$, based on the inputted U-phase upper-arm gate voltage detection signal 37$up$. The U-phase lower-arm driving circuit 62 outputs the U-phase lower-arm excessive-current-abnormality detection signal 50$un$, based on the inputted U-phase lower-arm DESAT signal 36$un$, and outputs the U-phase lower-arm gate-drive-abnormality detection signal 60$un$, based on the inputted U-phase lower-arm gate voltage detection signal 37$un$.

Based on the V-phase upper-arm PWM control signal PWM-vp inputted from the MICON 9 to the PWM input portion, the V-phase upper-arm driving circuit 63 generates the V-phase upper-arm gate driving signal 171$vp$ and provides the V-phase upper-arm gate driving signal 171$vp$ to the gate of the V-phase upper-arm semiconductor switching device Qvp of the electric-power conversion circuit 3. Based on the V-phase lower-arm PWM control signal PWM-vn inputted from the MICON 9 to the PWM input portion, the V-phase lower-arm driving circuit 64 generates the V-phase lower-arm gate driving signal 171$vn$ and provides the V-phase lower-arm gate driving signal 171$vn$ to the gate of the V-phase lower-arm semiconductor switching device Qvn of the electric-power conversion circuit 3.

In addition, the V-phase upper-arm driving circuit 63 outputs the V-phase upper-arm excessive-current-abnormality detection signal 50$vp$, based on the inputted V-phase upper-arm DESAT signal 36$vp$, and outputs the V-phase upper-arm gate-drive-abnormality detection signal 60$vp$, based on the inputted V-phase upper-arm gate voltage detection signal 37$vp$. The V-phase lower-arm driving circuit 64 outputs the V-phase lower-arm excessive-current-abnormality detection signal 50$vn$, based on the inputted V-phase lower-arm DESAT signal 36$vn$, and outputs the V-phase lower-arm gate-drive-abnormality detection signal 60$vn$, based on the inputted V-phase lower-arm gate voltage detection signal 37$vn$.

Based on the W-phase upper-arm PWM control signal PWM-wp inputted from the MICON 9 to the PWM input portion, the W-phase upper-arm driving circuit 65 generates the W-phase upper-arm gate driving signal 171$wp$ and provides the W-phase upper-arm gate driving signal 171$wp$ to the gate of the W-phase upper-arm semiconductor switching device Qwp of the electric-power conversion circuit 3. Based on the W-phase lower-arm PWM control signal PWM-wn inputted from the MICON 9 to the PWM input portion, the W-phase lower-arm driving circuit 66 generates the W-phase lower-arm gate driving signal 171$wn$ and provides the W-phase lower-arm gate driving signal 171$wn$ to the gate of the W-phase lower-arm semiconductor switching device Qwn of the electric-power conversion circuit 3.

In addition, the W-phase upper-arm driving circuit 65 outputs the W-phase upper-arm excessive-current-abnormality detection signal 50$wp$, based on the inputted W-phase upper-arm DESAT signal 36$wp$, and outputs the W-phase upper-arm gate-drive-abnormality detection signal 60$wp$, based on the inputted W-phase upper-arm gate voltage detection signal 37$wp$. The W-phase lower-arm driving circuit 66 outputs the W-phase lower-arm excessive-current-abnormality detection signal 50$wn$, based on the inputted W-phase lower-arm DESAT signal 36$wn$, and outputs the W-phase lower-arm gate-drive-abnormality detection signal 60$wn$, based on the inputted W-phase lower-arm gate voltage detection signal 37$wn$.

Each of the U-phase upper-arm excessive-current-abnormality detection signal 50$up$, the U-phase lower-arm excessive-current-abnormality detection signal 50$un$, the V-phase upper-arm excessive-current-abnormality detection signal 50$vp$, the V-phase lower-arm excessive-current-abnormality detection signal 50$vn$, the W-phase upper-arm excessive-current-abnormality detection signal 50$wp$, and the W-phase lower-arm excessive-current-abnormality detection signal 50$wn$ becomes H-level, when the current in the detection-subject semiconductor switching device is normal, and becomes L-level, when the current in the detection-subject semiconductor switching device is abnormal due to an excessive current.

In addition, each of the U-phase upper-arm gate-drive-abnormality detection signal 60$up$, the U-phase lower-arm gate-drive-abnormality detection signal 60$un$, the V-phase upper-arm gate-drive-abnormality detection signal 60$vp$, the V-phase lower-arm gate-drive-abnormality detection signal 60$vn$, the W-phase upper-arm gate-drive-abnormality detection signal 60$wp$, and the W-phase lower-arm gate-drive-abnormality detection signal 60$wn$ becomes H-level, when the gate voltage of the detection-subject semiconductor switching device is normal, and becomes L-level, when the gate voltage of the detection-subject semiconductor switching device is abnormal.

Next, the short-circuit control means 7 will be explained. The short-circuit control means 7 formed of an ASC has a first AND circuit 71, a second AND circuit 72, a third AND circuit 73, a fourth AND circuit 74, and a logic circuit unit 11.

The first AND circuit 71 receives the U-phase upper-arm excessive-current-abnormality detection signal 50$up$, the V-phase upper-arm excessive-current-abnormality detection signal. 50$vp$, excessive-current-abnormality and the W-phase upper-arm detection signal 50$wp$; when at least one of these inputted signals has an L level indicating an abnormality, the first AND circuit 71 outputs an L-level upper-arm excessive-current-abnormality detection signal 71$p$ indicating an excessive-current abnormality in the upper-arm semiconductor switching device; when all of the inputted signals each have an H level indicating a normality, the first AND circuit 71 outputs an A-level upper-arm excessive-current-abnormality detection signal 71p indicating that the current in the upper-arm semiconductor switching device is normal.

The second AND circuit 72 receives the U-phase upper-arm gate-drive-abnormality detection signal 60up, the V-phase upper-arm gate-drive-abnormality detection signal 60vp, and the W-phase upper-arm gate-drive-abnormality detection signal 60wp; when at least one of these inputted signals has an L level indicating an abnormality, the second AND circuit 72 outputs an L-level upper-arm gate-drive-abnormality detection signal 72p indicating an abnormality in the gate voltage of the upper-arm semiconductor switching device; when all of the inputted signals each have an H level indicating a normality, the second AND circuit 72 outputs an H-level upper-arm gate-drive-abnormality detection signal 72p indicating that the gate voltage of the upper-arm semiconductor switching device is normal.

The third AND circuit 73 receives the U-phase lower-arm excessive-current-abnormality detection signal 50un, the V-phase lower-arm excessive-current-abnormality detection signal 50vn, and the W-phase lower-arm excessive-current-abnormality detection signal 50wn; when at least one of these inputted signals has an L level indicating an abnormality, the third AND circuit 73 outputs an L-level lower-arm excessive-current-abnormality detection signal 73n indicating an excessive-current abnormality in the lower-arm semiconductor switching device; when all of the inputted signals each have an H level indicating a normality, the third AND circuit 73 outputs an H-level lower-arm excessive-current-abnormality detection signal 73n indicating that the current in the lower-arm semiconductor switching device is normal.

The fourth AND circuit 74 receives the U-phase lower-arm gate-drive-abnormality detection signal 60un, the V-phase lower-arm gate-drive-abnormality detection signal 60vn, and the W-phase lower-arm gate-drive-abnormality detection signal 60wn; when at least one of these inputted signals has an L level indicating an abnormality, the fourth AND circuit 74 outputs an L-level upper-arm gate-drive-abnormality detection signal 74n indicating an abnormality in the gate voltage of the lower-arm semiconductor switching device; when all of the inputted signals each have an H level indicating a normality, the fourth AND circuit 74 outputs an H-level lower-arm gate-drive-abnormality detection signal 74n indicating that the gate voltage of the lower-arm semiconductor switching device is normal.

As described above, the short-circuit control means 7 formed of an ASC monitors the DESAT signals 36 and the gate voltage detection signals 37 collectively for the upper arms and the lower arms. In this situation, when the short-circuit control means 7 monitors the DESAT signals 36 and the gate voltage detection signals 37, the generation timings of the signals are not the same; thus, filter time constants are provided in the logic circuit unit 11 so that the generation timings of the signals are adjusted within a range, for example, the same as or shorter than half of the switching period of each of the respective phases, through the settling time or the latency of each of the ASC1 input portion and the ASC2 input portion of the driving circuit 6.

The logic circuit unit 11 is formed of hardware items, for example, a general-purpose logic circuit such as an AND circuit, an OR circuit, or a NOT circuit, a resistor, a diode, a transistor, and the like; based on the upper-arm excessive-current-abnormality detection signal 71p to be inputted to an input portion a, the upper-arm gate-drive-abnormality detection signal 72p to be inputted to an input portion b, the lower-arm excessive-current-abnormality detection signal 73n to be inputted to an input portion c, and the lower-arm gate-drive-abnormality detection signal 74n to be inputted to an input portion d, the logic circuit unit 11 outputs the first ASC signal ASC1 with the H level indicating a normality or with the L level indicating an abnormality from a first output portion A1 and the second ASC signal ASC2 with the H level indicating a normality or with the L level indicating an abnormality from a second output portion A2.

Next, the relationship between the foregoing signals to be inputted to the logic circuit unit 11 of the short-circuit control means 7 and the first ASC signal ASC1 and the second ASC signal ASC2 to be outputted from the logic circuit unit 11 will be explained.

FIG. 9 is an explanatory table representing the relationship among the input signals of the logic circuit unit, the output signals thereof, and the gate control in the electric-power conversion apparatus according to Embodiment 1. In addition, in the present embodiment, each of the upper-arm excessive-current-abnormality detection signal 71p to be inputted to the input portion a, the upper-arm gate-drive-abnormality detection signal 72p to be inputted to the input portion b, the lower-arm excessive-current-abnormality detection signal 73n to be inputted to the input portion c, and the lower-arm gate-drive-abnormality detection signal 74n to be inputted to the input portion d will be referred to simply as an input signal.

As represented in FIG. 9, when the combination of the respective input signals to be inputted to the input portions a, b, c, and d of the logic circuit unit 11 is the combination (1), both the first ASC signal ASC1 and the second ASC signal ASC2 to be outputted from the logic circuit unit 11 become H-level; thus, each of the semiconductor switching devices Qup, Qun, Qvp, Qvn, Qwp, and Qwn is driven normally, based on the PWM control signal.

In contrast, when the combination of the respective input signals to be inputted to the input portions a, b, c, and d is any one of the six kinds of combinations represented in the combination (2) in FIG. 9, the first ASC signal ASC1 and the second ASC signal ASC2 to be outputted from the logic circuit unit 11 become L-level and H-level, respectively. As a result, as the fail-safe operation, the lower-arm semiconductor switching devices Qun, Qvn, and Own of all the three phases are forcibly turned on and the short-circuit control through the lower arms of all the phases is performed.

In addition, when the combination of the respective input signals to be inputted to the input portions a, b, c, and d is any one of the five kinds of combinations represented in the combination (3) in FIG. 9, the first ASC signal ASC1 and the second ASC signal ASC2 to be outputted from the logic circuit unit 11 become H-level and L-level, respectively. As a result, as the fail-safe operation, the upper-arm semiconductor switching devices Qup, Qvp, and Qwp of all the three phases are forcibly turned on and hence the short-circuit control through the upper arms of all the phases is performed.

In addition, when the combination of the respective input signals to be inputted to the input portions a, b, c, and d is any one of the four kinds of combinations represented in the combination (4) in FIG. 9, both the first ASC signal ASC1 and the second ASC signal. ASC2 to be outputted from the logic circuit unit 11 become L-level; as the fail-safe operation, all the semiconductor switching devices Qup, Qun, Qvp, Qvn, Qwp, and Own are turned off or the electric-power conversion circuit 3 is disconnected from the DC power source 1, and hence so-called shutoff control is performed.

In FIG. 2, in each of the U-phase upper-arm driving circuit 61, the U-phase lower-arm driving circuit 62, the V-phase upper-arm driving circuit 63, the V-phase lower-arm driving circuit 64, the W-phase upper-arm driving circuit 65, and the W-phase lower-arm driving circuit 66, the first ASC signal ASC1 and the second ASC signal ASC2 outputted from the short-circuit control means 7 are inputted to the ASC1 input portion and the ASC2 input portion, respectively.

Each of the U-phase upper-arm driving circuit 61, the U-phase lower-arm driving circuit 62, the V-phase upper-arm driving circuit 63, the V-phase lower-arm driving circuit 64, the W-phase upper-arm driving circuit 65, and the W-phase lower-arm driving circuit 66, performs the foregoing fail-safe operation in accordance with the respective level states of the inputted first ASC signal ASC1 and the second ASC signal ASC2.

Next, the related configuration between the upper- and lower-arm semiconductor switching devices and the respective driving circuits will be explained. Here, the U-phase leg formed of a series circuit including the U-phase upper arm and the U-phase lower arm will be explained. Each of the V-phase leg formed of a series circuit including the V-phase upper arm and the V-phase lower arm and the W-phase leg formed of a series circuit including the W-phase upper arm and the W-phase lower arm has a configuration the same as that of the U-phase leg.

Figure 3:
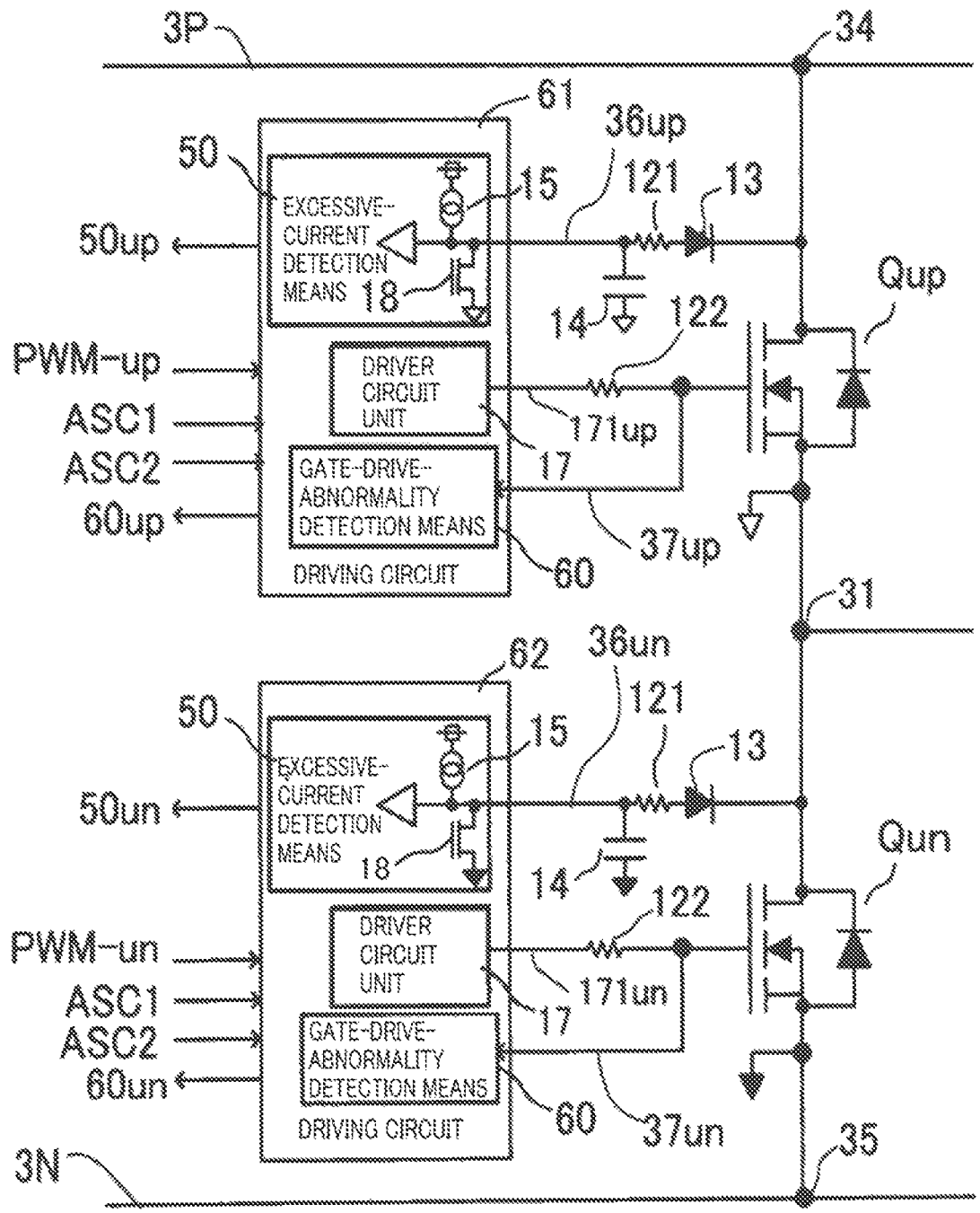
FIG. 3 is a configuration diagram representing a related configuration between respective driving circuits and U-phase upper-arm and lower-arm semiconductor switching devices in the electric-power conversion apparatus according to Embodiment 1.

FIG. 3 is a configuration diagram representing the related configuration between respective driving circuits and the U-phase upper-arm and lower-arm semiconductor switching devices in the electric-power conversion apparatus according to Embodiment 1. In FIG. 3, as described above, the excessive-current detection means 50 in each of the U-phase upper-arm driving circuit 61 and the U-phase lower-arm driving circuit 62 is formed of the DESAT detection unit; however, in FIG. 3, excessive-current detection means 50 is designated as an excessive-current detection means.

The DESAT detection through the DESAT detection unit as the excessive-current detection means 50 in each of the U-phase upper-arm driving circuit 61 and the U-phase lower-arm driving circuit 62 is a method of protecting the semiconductor switching devices Qup and Qun, each formed of an IGBT, a Si or SiC-MOSFET, a GaN-FET, or the like, from an excessive current such as a load short-circuit current that causes breakage.

The DESAT detection unit as the excessive-current detection means 50 in each of the U-phase upper-arm driving circuit 61 and the U-phase lower-arm driving circuit 62 detects a DESAT voltage Vdesat by making a constant current flow from a current source 15 to each of the semiconductor switching devices Qup and Qun; by monitoring the DESAT voltage Vdesat, the DESAT detection unit detects the saturation voltage of the semiconductor switching device Qup at a time of short-circuiting so as to protect the U-phase upper-arm semiconductor switching device Qup.

The input portion of the DESAT detection unit as the excessive-current detection means 50 in each of the U-phase upper-arm driving circuit 61 and the U-phase lower-arm driving circuit 62 is connected with the parallel connection point between a capacitor 14 and a series circuit consisting of a resistor 121 and a diode 13.

The cathode of the U-phase upper-arm diodes 13 is connected with the drain terminal of the semiconductor switching device Qup; the cathode of the U-phase lower-arm diode 13 is connected with the drain terminal of the semiconductor switching devices Qun.

The driver circuit unit 17 provides the U-phase upper-arm gate driving signal 171up to the gate of the U-phase upper-arm semiconductor switching device Qup through a resistor 122; when the U-phase upper-arm gate driving signal 171up is H-level, a Hi-level gate-source voltage is applied to the semiconductor switching device Qup. In the DESAT detection unit of the U-phase upper-arm driving circuit 61, after a predetermined mask time ranging from a time point before to a time point after a rise in the gate-source voltage, a charging current flows from the current source 15 to the semiconductor switching device Qup.

Similarly, the driver circuit unit 17 provides the U-phase lower-arm gate driving signal 171un to the gate of the U-phase lower-arm semiconductor switching device Qun through the resistor 122; when the U-phase lower-arm gate driving signal 171un is H-level, the Hi-level gate-source voltage is applied to the semiconductor switching device Qun. In the DESAT detection unit of the U-phase lower-arm driving circuit 62, after a predetermined mask time ranging from a time point before to a time point after a rise in the gate-source voltage, a charging current flows from the current source 15 to the semiconductor switching device Qun.

In each of the U-phase upper arm and the U-phase lower arm, because at a time of normal operation, the voltage of saturation, due to a load current, between the drain and the source of each of the semiconductor switching devices Qup and Qun is low, the current path ramifies into a forward path consisting of the resistor 121 and the diode 131 and a path of the capacitor 14.

In contrast, when the load current to each of the U-phase upper-arm semiconductor switching device Qup and the U-phase lower-arm switching device Qun is excessive, the drain-source saturation voltage of each of the U-phase upper-arm semiconductor switching device Qup and the U-phase lower-arm semiconductor switching device Qun becomes higher than the voltage at the cathode of the diode 13; thus, the current path is only at the capacitor side and hence the current flows only in the capacitor 14, without ramifying into each of the semiconductor switching devices Qup and Qun.

Accordingly, the DESAT detection unit as the excessive-current detection means 50 in each of the U-phase upper arm and the U-phase lower arm receives each corresponding one of the U-phase upper-arm DESAT signal 36up and the U-phase lower-arm DESAT signal 36un, each of which is the voltage across the capacitor 14, so as to detect the DESAT voltage; when the detected DESAT voltage Vdesat exceeds a threshold voltage, the DESAT detection unit outputs each corresponding one of the U-phase upper-arm excessive-current-abnormality detection signal 50up and the U-phase lower-arm excessive-current-abnormality detection signal 50un.

The threshold value of each of the U-phase upper arm and U-phase lower arm DESAT voltages Vdesat and the resistance value of the resistor 121 are preliminarily set to appropriate values. In addition, a blanking time, which is the foregoing mask time ranging from a time point before to a time point after a rise in the gate-source voltage of each of the semiconductor switching devices Qup and Qun, is preliminarily set to an appropriate value.

When the U-phase upper-arm gate driving signal 171up becomes L-level and hence the gate voltage becomes Lo-level, a MOSFET 18 in the DESAT detection unit as the excessive-current detection means 50 turns on; then, the electric charges in the capacitor 14 are discharged.

Similarly, when the U-phase lower-arm gate driving signal 171*un* has the Lo level as the L level, a MOSFET 18 in the DESAT detection unit as the excessive-current detection means 50 turns on; then, the electric charges in the capacitor 14 are discharged.

As described above, the DESAT detection unit as the excessive-current detection means 50 in each of the U-phase upper arm and the U-phase lower arm detects the DESAT voltage Vdesat, when turning on corresponding one of the semiconductor switching devices Qup and Qun in the subject arm. Thus, when the gate voltage of each of the semiconductor switching devices Qup and Qun is Hi-level, the DESAT detection unit detects whether the current flowing in each of the semiconductor switching devices Qup and Qun is normal or abnormal.

In the case where even when the U-phase upper-arm PWM control signal PWM-up to be inputted from the MICON 9 has a signal level that turns on the semiconductor switching device Qup, the DESAT detection unit in the U-phase upper arm detects an abnormality in the DESAT voltage Vdesat, the driving circuit unit 17 in the U-phase upper-arm driving circuit 61 switches the gate voltage as the U-phase upper-arm gate driving signal 171*up* from Hi level to Lo level, detects an abnormality in the U-phase upper-arm DESAT signal 36*up*, and notifies the later-stage short-circuit control means 7 with the abnormality, as the U-phase upper-arm excessive-current-abnormality detection signal 50*up*.

Similarly, in the case where even when the U-phase lower-arm PWM control signal PWM-un to be inputted from the MICON 9 has a signal level that turns on the semiconductor switching device Qun, the DESAT detection unit in the U-phase lower arm detects an abnormality in the DESAT voltage Vdesat, the driving circuit unit 17 in the U-phase lower-arm driving circuit 62 switches the gate voltage as the U-phase lower-arm gate driving signal 171*un* from Hi level to Lo level, detects an abnormality in the U-phase lower-arm DESAT signal 36*un*, and notifies the later-stage short-circuit control means 7 with the abnormality, as the U-phase lower-arm excessive-current-abnormality detection signal 50*un*.

As described above, the DESAT detection unit can detect an excessive current in the subject arm so as to stop gate driving for the subject arm; however, because instantaneously detecting the excessive current so as to perform gate shutoff of the semiconductor switching device, the DESAT detection unit can hardly determine whether the semiconductor switching device has a short-circuit failure or an open failure.

Moreover, the DESAT method can determine neither whether an abnormality exists in the upper arm or in the lower arm nor whether the abnormality is temporary or continuous due to a short-circuit failure, an open failure, or the like in the semiconductor switching device. Accordingly, in a conventional technology such as the one disclosed in Patent Document, the three-phase short-circuit control has been performed by determining the failure arm and whether the failure is a short-circuit failure or an open failure, while utilizing the DESAT signal as a trigger and ascertaining the phase current by a current sensor or the like.

As described above and below, in the electric-power conversion apparatus according to Embodiment 1 of the present disclosure, the short-circuit control is performed by making the short-circuit control means turn on all the semiconductor switching devices in any one of the upper arm and the lower arm, based on the result of abnormality detection by the excessive-current detection means and the result of abnormality detection by the gate-drive-abnormality detection means.

Next, the gate-drive-abnormality detection means 60 in each of the U-phase upper-arm driving circuit 61 and the U-phase lower-arm driving circuit 62 will be explained. As illustrated in FIG. 3, the U-phase upper-arm driving circuit 61 has the gate-drive-abnormality 60 for monitoring the gate-source voltage of the U-phase upper-arm semiconductor switching device Qup, and determines whether the gate-source voltage of the semiconductor switching device Qup has reached a predetermined voltage.

For example, the gate-drive-abnormality detection means 60 in the U-phase upper-arm driving circuit 61 has a determination threshold-value voltage for detecting Hi fixation or Lo fixation of the gate voltage of the subject semiconductor switching device Qup, and detects by use of a comparator or the like whether or not there exists Hi fixation or Lo fixation of the gate voltage of the semiconductor switching device Qup, in accordance with the H level or the L level state of the U-phase upper-arm PWM control signal PWM-up from the MICON 9. The gate-drive-abnormality detection means 60 in the U-phase upper-arm driving circuit 61 outputs the detection result, as the U-phase upper-arm gate-drive-abnormality detection signal 60*up*.

Similarly, the U-phase lower-arm driving circuit 62 has the gate-drive-abnormality detection means 60 for monitoring the gate-source voltage of the UU-phase lower-arm semiconductor switching device Qun, and determines whether the gate-source voltage of the semiconductor switching device Qun has reached a predetermined voltage.

For example, the gate-drive-abnormality detection means 60 in the U-phase lower-arm driving circuit 62 has a determination threshold-value voltage for detecting Hi fixation or Lo fixation of the gate voltage of the subject semiconductor switching device Qun, and detects by use of a comparator or the like whether or not there exists Hi fixation or Lo fixation of the gate voltage of the semiconductor switching device Qun, in accordance with the Hi level or the Lo level state of the U-phase lower-arm PWM control signal PWM-un from the MICON 9. The gate-drive-abnormality detection means 60 in the U-phase lower-arm driving circuit 62 outputs the detection result, as the U-phase lower-arm gate-drive-abnormality detection signal 60*un*.

The driver circuit unit 17 in each of the U-phase upper-arm driving circuit 61 and the U-phase lower-arm driving circuit 62 controls the gate of the subject one of the semiconductor switching devices Qup and Qun, as represented in FIG. 4, in response to the first ASC signal ASC1 and the second ASC signal ASC2.

In other words, FIG. 4 is an explanatory table representing the relationship among the output signals of the logic circuit unit, the gate voltage, and the gate control in the electric-power conversion apparatus according to Embodiment 1; corresponding to the first ASC signal ASC1 and the second ASC signal ASC2 from the logic circuit unit 11 in the short-circuit control means 7 formed of an ASC, the gate voltage as the gate driving signal 171 outputted from each of the driver circuit units 17 in the driving circuit 6 and the gate control are represented.

In the case where as represented in FIG. 4, each of the first ASC signal ASC1 and the second ASC signal ASC2 from the logic circuit unit 11 in the short-circuit control means 7 is L-level, each of the gate voltages of the upper-arm and lower-arm driver circuit units 17 of all the phases is Lo-level; thus, all the semiconductor switching devices Qup, Qun, Qvp, Qvn, Qwp, and Qwn are turned off and hence all the phases are turned off.

Moreover, in the case where the first ASC signal ASC1 and the second ASC signal ASC2 from the logic circuit unit 11 are L-level and H-level, respectively, each of the gate voltages of the lower-arm driver circuit units 17 of all the phases becomes Hi-level, and hence three-phase short-circuit control is applied to the lower-arm semiconductor switching devices Qun, Qvn, and Qwn.

Furthermore, in the case where the first ASC signal ASC1 and the second ASC signal ASC2 from the logic circuit unit 11 are H-level and L-level, respectively, each of the gate voltages of the upper-arm driver circuit units 17 of all the phases becomes Hi-level, and hence three-phase short-circuit control is applied to the upper-arm semiconductor switching devices Qup, Qvp, and Qwp.

In addition, in the case where each of the first ASC signal ASC1 and the second ASC signal ASC2 from the logic circuit unit 11 is H-level, the PWM control signal 10 from the MICON 9 to each of the driving circuits becomes effective; based on the PWM control signals 10 outputted from the MICON 9, all the semiconductor switching devices Qup, Qun, Qvp, Qvn, Qwp, and Qwn are PWM-controlled; then, the electric-power conversion circuit 3 is driven as an inverter or a converter.

In addition, in the foregoing explanation, the excessive-current detection means 50 and the gate-drive-abnormality detection means 60 are provided in each of the upper-arm and lower-arm driving circuits of all the phases; however, the excessive-current detection means 50 and the gate-drive-abnormality detection means 60 may be provided outside of the driving circuit, and each of these means may be configured with not only hardware but also software.

Next, there will be explained the method of determining which one of the upper arm and the lower arm is utilized for performing the three-phase short-circuit control. Specifically, the upper-arm or the lower-arm gate-drive-abnormality detection signal and the upper-arm or the lower-arm excessive-current-abnormality detection signal are combined so as to determine which one of the upper arm and the lower arm is utilized for performing the three-phase short-circuit control; then, the three-phase short-circuit control is performed.

In the following explanation, an example with the U phase will be explained. In addition, each of the case with the V phase and the case with the W phase is the same as the case with the U phase; thus, the explanations therefor will be omitted.

(1) In the case where lower-arm gate voltage detection signal is abnormal and lower-arm DESAT signal is abnormal:

In this case, the U-phase lower-arm gate voltage is Hi-level, and both the U-phase lower-arm gate voltage detection signal 37*un* and the U-phase lower-arm excessive-current-abnormality detection signal 50*un* are abnormal; thus, it can be determined that Hi fixation exists in the U-phase lower-arm semiconductor switching device Qun.

Figure 5:
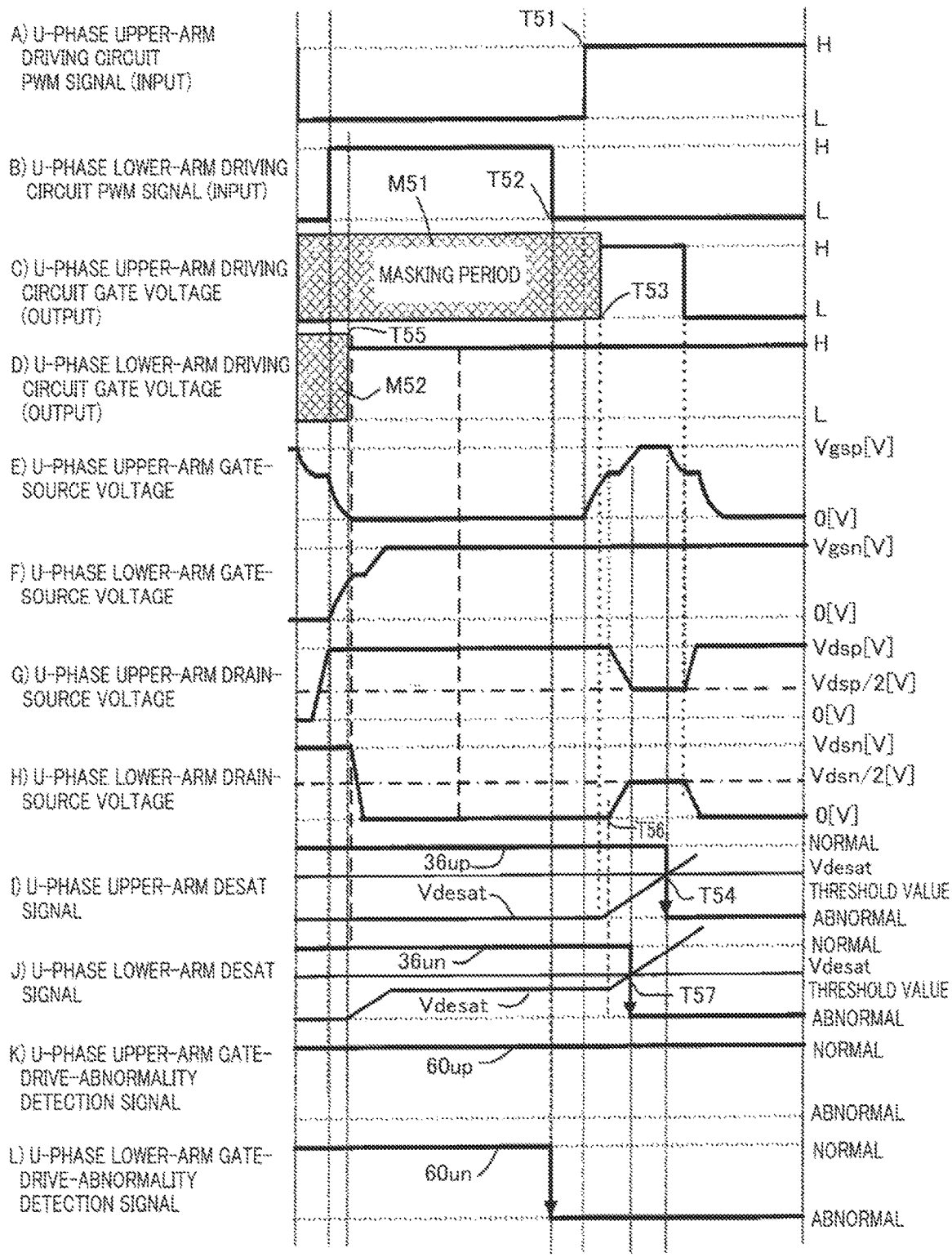
FIG. 5 is a waveform chart representing the operation at a time when Hi fixation occurs in the U-phase lower arm in the electric-power conversion apparatus according to Embodiment 1.

FIG. 5 is a waveform chart representing the operation at a time when Hi fixation occurs in the U-phase lower arm in the electric-power conversion apparatus according to Embodiment 1. In FIG. 5, the abscissa denotes the time, and the ordinate denotes the following items. That is to say, in the ordinate of FIG. 5, there are denoted A) the U-phase upper-arm PWM control signal PWM-up to be inputted to the U-phase upper-arm driving circuit 61, B) the U-phase lower-arm PWM control signal PWM-un to be inputted to the U-phase lower-arm driving circuit 62, C) the gate voltage applied to the gate of the U-phase upper-arm semiconductor switching device Qup, and D) the gate voltage applied to the gate of the U-phase lower-arm semiconductor switching device Qun.

In addition, there are denoted

E) the gate-source voltage Vgsp [V] of the U-phase upper-arm semiconductor switching device Qup, F) the gate-source voltage Vgsn [V] of the U-phase lower-arm semiconductor switching device Qun, G) the drain-source voltage Vasp [V] of the U-phase upper-arm semiconductor switching device Qup, H) the drain-source voltage Vasn [V] of the U-phase lower-arm semiconductor switching device Qun, I) the U-phase upper-arm DESAT signal 36*up*, J) the U-phase lower-arm DESAT signal 36*un*, K) the U-phase upper-arm excessive-current-abnormality detection signal 50*up*, and L) the U-phase lower-arm excessive-current-abnormality detection signal 50*un*.

In FIG. 5, at a time point T51, the level of the U-phase upper-arm PWM control signal PWM-up represented in A) rises from the L level to the H level; at the time point T51, in response to the rise, the gate voltage of the U-phase upper-arm driving circuit 61, represented in C), rises from the L level to the H level. In contrast, at a time point T52, the U-phase lower-arm PWM control signal PWM-un represented in B) falls from the H level to the L level; however, due to the Hi fixation, the gate voltage of the U-phase lower-arm driving circuit 62, represented in D), remains H-level at and after the time point T52.

The U-phase upper-arm DESAT voltage Vdesat represented in I) gradually increases from a time point T53 at which a mask period M 51 represented in C) ends, and reaches a Vdesat threshold value at a time point T54. As a result, the U-phase upper-arm DESAT signal 36*up* changes from "normal" to "abnormal" at a time point T54; then, at the time point T54, the level of the U-phase upper-arm excessive-current-abnormality detection signal 50*up* becomes the L level indicating abnormality.

In contrast, the U-phase lower-arm DESAT voltage Vdesat represented in J) gradually increases from a time point T55 at which a mask period M52 represented in D) ends, and further gradually increases at a time point T56 at which the drain-source voltage Vdsn [V] of the U-phase lower-arm semiconductor switching device Qun, represented in H), rises; then, the U-phase lower-arm DESAT voltage Vdesat reaches the Vdesat threshold value at a time point T57. As a result, at the time point T57, the U-phase lower-arm DESAT signal 36*un* represented in J) changes from "normal" to "abnormal".

Because at the time point T52 at which the level of the U-phase lower-arm PWM control signal PWM-un represented in B) transits from the H level to the L level, the U-phase lower-arm DESAT voltage Vdesat represented in J) is not 0 [V], the level of the U-phase lower-arm gate-drive-abnormality detection signal 60*un* represented in L) becomes the L level indicating an abnormality from the H level indicating a normality at the time point T52 at which the level of the U-phase lower-arm PWM control signal PWM-un represented in B) falls from the H level to the L level; thus, an abnormality in the U-phase lower-arm gate driving voltage is detected. The U-phase upper-arm gate-drive-abnormality detection signal 60*up* represented in K) continues to have the H level indicating a normality.

In addition, after the U-phase upper-arm PWM control signal PWM-up has risen to the H level at the time point T51, the gate-source voltage of the U-phase upper-arm semiconductor switching device Qup, represented in E), rises and the drain-source voltage of the U-phase upper-arm semiconductor switching device Qup, represented in G), falls and reaches Vdsp/2 [V] at the time point T57. Simultaneously, at this time point T57, the drain-source voltage of the U-phase lower-arm semiconductor switching device Qun, represented in H), reaches Vdsn/2 [V].

As described above, in the case where the U-phase lower-arm semiconductor switching has device Qun Hi fixation, an abnormality in the lower-arm gate driving is detected at the time point T52 at which the level of the U-phase lower-arm PWM control signal PWM-un transits from the H level to the L level; after at the time point T51, the level of the U-phase upper-arm PWM control signal PWM-up transits from the L level to the H level, the U-phase lower-arm DESAT signal becomes abnormal at the time point T57; then, an excessive-current abnormality in the U-phase lower arm is detected.

The foregoing explanation is made for the case where the U-phase lower-arm semiconductor switching device has Hi fixation; however, similar operation is performed either in the case where the U-phase upper-arm semiconductor switching device has Hi fixation or in the case where the V phase or the W phase has Hi fixation, in accordance with each of the cases.

As described above, in the case where the gate-drive-abnormality detection signal is abnormal and the DESAT signal is abnormal, the three-phase short-circuit control is performed in the arm where the gate-drive-abnormality detection signal is abnormal, so that a secondary failure, for example, due to short-circuiting between the upper arm and the lower arm can be prevented.

(2) In the case where the gate-drive-abnormality detection signal of any one of the upper arm and the lower arm is abnormal:

In this case, because the DESAT signal in each of the upper arm and the lower arm is normal, neither an open failure nor a short-circuit failure exists in the upper-arm and lower-arm semiconductor switching devices. Because only the gate-drive-abnormality detection signal is abnormal and no abnormality occurs in the DESAT signal, it can be determined that the subject arm has Lo fixation.

Figure 6:
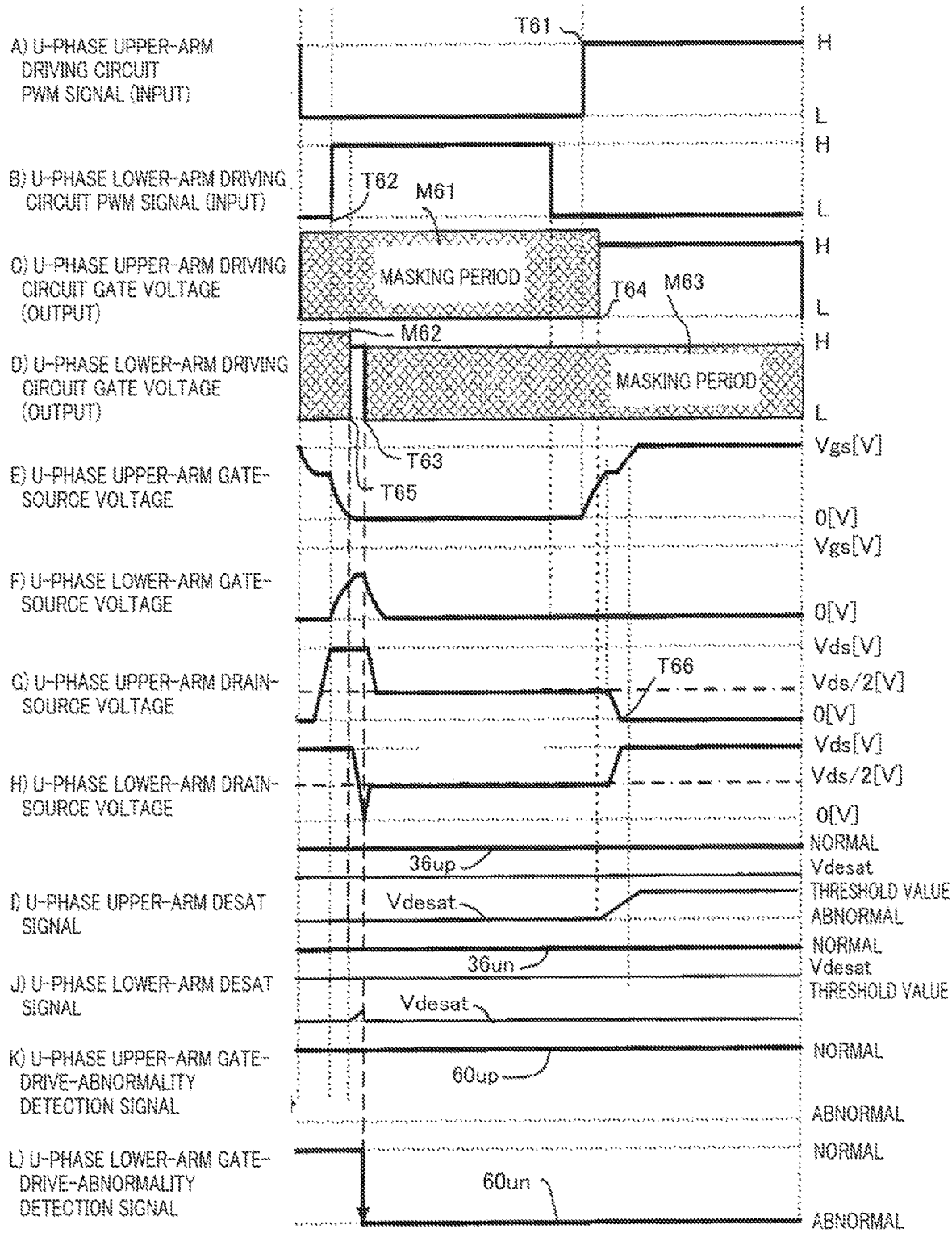
FIG. 6 is a waveform chart representing the operation at a time when Lo fixation occurs in the U-phase lower arm in the electric-power conversion apparatus according to Embodiment 1.

FIG. 6 is a waveform chart representing the operation at a time when Lo fixation occurs in the U-phase lower arm in the electric-power conversion apparatus according to Embodiment 1. In FIG. 6, the abscissa denotes the time, and A) through L) in the ordinate are respective voltage waveforms or signal waveforms corresponding to A) through L) in FIG. 5.

In FIG. 6, at a time point T61, the level of the U-phase upper-arm PWM control signal PWM-up represented in A) rises from the L level to the H level; at the time point T61, in response to the rise, the gate voltage of the U-phase upper-arm driving circuit 61, represented in C), rises from the L level to the H level. In contrast, at a time point T62, the level of the U-phase lower-arm PWM control signal PWM-un represented in B) rises from the L level to the H level; in response to the rise, the gate voltage of the U-phase lower-arm driving circuit 62, represented in D), rises at the time point T62.

The gate voltage of the U-phase lower-arm driving circuit 62, represented in D), rises to the H level at the time point T62; however, because the U-phase lower-arm semiconductor switching device Qun has Lo fixation, the gate voltage of the U-phase lower-arm driving circuit 62 falls to the L level at a time point T63. The gate voltage of the U-phase lower-arm driving circuit 62 falls to the L level at the time point T63 and is blocked by a mask period M63; after that, the mask period M63 is continued.

The U-phase upper-arm DESAT voltage Vdesat represented in I) gradually increases from a time point T64 at which a mask period M 61 represented in C) ends, and continues to be a value that does not reach the Vdesat threshold value. As a result, the U-phase upper-arm DESAT signal 36up continuously indicates a normality.

In contrast, although gradually increasing from a time point T65 at which a mask period M62 represented in D) ends, the U-phase lower-arm DESAT voltage Vdesat represented in J) immediately falls to the original level before its gradual increase, at the time point T63 at which the U-phase lower-arm gate voltage becomes L-level; after that, the U-phase lower-arm DESAT voltage Vdesat continues to be in a state of not reaching the Vdesat threshold value. As a result, the U-phase lower-arm DESAT signal 36un continuously indicates a normality.

As a result of the foregoing operation, the U-phase upper-arm gate-drive-abnormality detection signal 60up represented in K) continuously indicates a normality. In contrast, the U-phase lower-arm gate-drive-abnormality detection signal 60un represented in L) transits from "normal" to "abnormal" and continuously indicates an abnormality, thereafter.

In addition, after the U-phase upper-arm PWM control signal PWM-up has risen to the H level at the time point T61, the gate-source voltage of the U-phase upper-arm semiconductor switching device Qup, represented in E), rises and the drain-source voltage of the U-phase upper-arm semiconductor switching device Qup, represented in G), falls and reaches 0 [V] at a time point T66. Simultaneously, at this time point T66, the drain-source voltage of the U-phase lower-arm semiconductor switching device Qun, represented in H), reaches Vasn [V].

As described above, in the case where the U-phase lower-arm semiconductor switching device Qun has Lo fixation, the gate voltage of the U-phase lower-arm driving circuit 62 is the L level even when the level of the U-phase lower-arm PWM control signal PWM-un becomes the H level; thus, the abnormality can be detected through the U-phase lower-arm gate-drive-abnormality detection signal 60un.

Moreover, because both the U-phase upper-arm DESAT signal 36up and the U-phase lower-arm DESAT signal 36un are normal, neither open failure nor short-circuit failure exists in the U-phase upper-arm and U-phase lower-arm semiconductor switching devices. In addition, because in the DESAT method as an excessive-current detection means, DESAT-detection operation is performed when the semiconductor switching device is turned on, Lo fixation in gate driving can be determined.

The foregoing explanation is made for the case where the U-phase lower-arm semiconductor switching device has Lo fixation; however, similar operation is performed either in the case where the U-phase upper-arm semiconductor switching device has Lo fixation or in the case where the V phase or the W phase has Lo fixation, in accordance with each of the cases.

Therefore, in the case where the gate-drive-abnormality detection signal of any one of the upper arm and the lower arm is abnormal, a secondary failure caused by short-circuiting between the upper arm and the lower arm or the like can be prevented by performing the three-phase short-circuit control of the arm opposite to the arm where the gate-drive-abnormality detection signal has become abnormal.

(3) In the case where the DESAT signal of any one of the upper arm and the lower arm is abnormal:

When only the DESAT signal is abnormal, it can be determined that the gate driving in each of the upper arm and the lower arm is normal. In the DESAT method, DESAT is detected when the semiconductor switching device is turned on. Accordingly, in the case where when the semiconductor switching device of one of the upper arm and the lower arm has a short-circuit failure, the semiconductor switching device of the other one thereof is turned on, an abnormality in the DESAT signal of the ON-side arm can be detected.

In the case where when the semiconductor switching device of one of the upper arm and the lower arm has an open failure, the semiconductor switching device of the other one thereof is turned on, no short-circuit current flows; thus, the DESAT signal remains normal. Accordingly, when the semiconductor switching device in the open-failure-side arm is turned on, the current from the current source of DESAT detection unit does not ramify into the semiconductor switching device but flows to the capacitor; thus, an abnormality in the DESAT signal of the open-failure-side arm can be detected.

Figure 7:
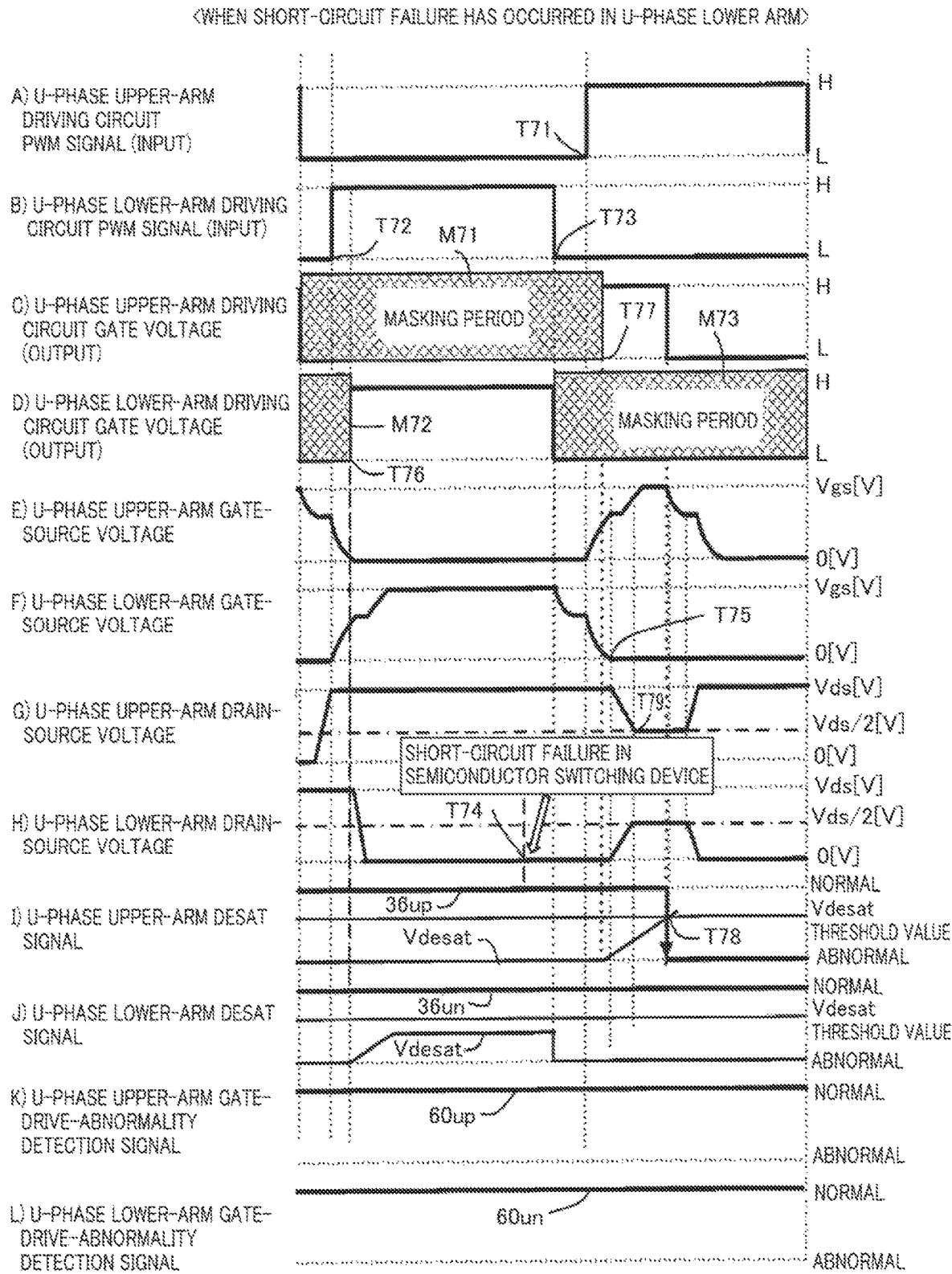
FIG. 7 is a waveform chart representing the operation at a time when a short-circuit failure occurs in the U-phase lower arm in the electric-power conversion apparatus according to Embodiment 1.

Next, at first, there will be explained the case where the semiconductor switching device of one of the upper arm and the lower arm has a short-circuit failure. FIG. 7 is a waveform chart representing the operation at a time when a short-circuit failure occurs in the U-phase lower arm in the electric-power conversion apparatus according to Embodiment 1. In FIG. 7, the abscissa denotes the time, and A) through L) in the ordinate are respective voltage waveforms or signal waveforms corresponding to A) through L) in FIG. 5.

In FIG. 7, at a time point T71, the level of the U-phase upper-arm PWM control signal PWM-up represented in A) rises from the L level to the H level; at the time point T71, in response to the rise, the gate voltage of the U-phase upper-arm driving circuit 61, represented in C), rises from the L level to the H level. In contrast, at a time point T72, the level of the U-phase lower-arm PWM control signal PWM-un represented in B) rises from the L level to the H level; in response to the rise, the gate voltage of the U-phase lower-arm driving circuit 62, represented in D), rises at the time point T72.

The gate voltage of the U-phase lower-arm driving circuit 62, represented in D), rises at the time point T72 and falls at a time point T73, in synchronization with the behavior of the U-phase lower-arm PWM control signal PWM-un represented in B). In this situation, as represented in H), when at a time point T74, a short-circuit failure occurs in the U-phase lower-arm semiconductor switching device Qun, the drain-source voltage of the U-phase lower-arm semiconductor switching device Qun, represented in H), remains 0 [V], even when the gate voltage of the U-phase lower arm, represented in D) becomes L-level at the time point T73, and continues to be 0 [V] till a time point T75 at which the gate-source voltage of the U-phase lower-arm semiconductor switching device Qun, represented in F), becomes 0 [V].

The drain-source voltage of the U-phase lower-arm semiconductor switching device Qun, represented in H), gradually increases from 0 [V] at the time point T75 and reaches the drain-source voltage Vds/2 [V] at a time point T79. Although gradually increasing from a time point T76 at which a mask period M72 for blocking the U-phase lower-arm gate voltage represented in D) ends, the U-phase lower-arm DESAT voltage Vdesat represented in J) does not reach the Vdesat threshold value and returns to the original voltage value, at the time point T73 at which the U-phase lower-arm PWM control signal PWM-un represented in B) transits to the L level. Accordingly, the U-phase lower-arm DESAT signal 36un represented in J) remains normal without becoming abnormal.

In contrast, because after the gate voltage of the U-phase upper-arm driving circuit 61, represented in C), rises to the H level at the time point T71, the upper-arm semiconductor switching device Qup is turned on at a time point T77 at which a mask period M71 ends, a short-circuit current caused by a short-circuit failure in the lower-arm semiconductor switching device Qun flows; as a result, the U-phase upper-arm DESAT voltage Vdesat represented in I) gradually increases from the time point T77 and reaches the Vdesat threshold value at a time point T78, and then the U-phase upper-arm DESAT signal 36up becomes abnormal.

Neither the gate-source voltage of the U-phase upper-arm driving circuit 61, represented in E), nor the gate-source voltage of the U-phase lower-arm driving circuit 62, represented in F), becomes abnormal; thus, both the U-phase upper-arm gate-drive-abnormality detection signal 60up represented in K) and the U-phase lower-arm gate-drive-abnormality detection signal 60un represented in L) continuously indicate a normality.

In addition, after the U-phase upper-arm PWM control signal PWM-up has risen to the H level at the time point T71, the gate-source voltage of the U-phase upper-arm semiconductor switching device Qup, represented in E), rises and the drain-source voltage of the U-phase upper-arm semiconductor switching device Qup, represented in G), falls and reaches Vdsn/2 [V] at the time point T79. Simultaneously, at this time point T79, the drain-source voltage of the U-phase lower-arm semiconductor switching device Qun, represented in H), reaches Vdsn/2 [V].

The foregoing explanation is made for the case where the U-phase lower-arm semiconductor switching device has a short-circuit failure; however, similar operation is performed either in the case where the U-phase upper-arm semiconductor switching device has a short-circuit failure or in the case where the V phase or the W phase has a short-circuit failure, in accordance with each of the cases.

As described above, in the case where when the lower-arm semiconductor switching device has a short-circuit failure and the lower-arm semiconductor switching device is kept ON, the source-drain voltage thereof is short-circuited and hence no voltage is generated therebetween. However, when the upper-arm semiconductor switching device is turned on, a short-circuit current flows between the upper arm and the lower arm of that phase and hence the power-source voltage is divided by the upper-arm and lower-arm semiconductor switching devices. As described above, because in the DESAT method, the DESAT voltage is detected when the semiconductor switching device is turned on, an abnormality in the DESAT voltage, i.e., an abnormality caused by an excessive current can be detected by the upper-arm DESAT signal.

Figure 8:
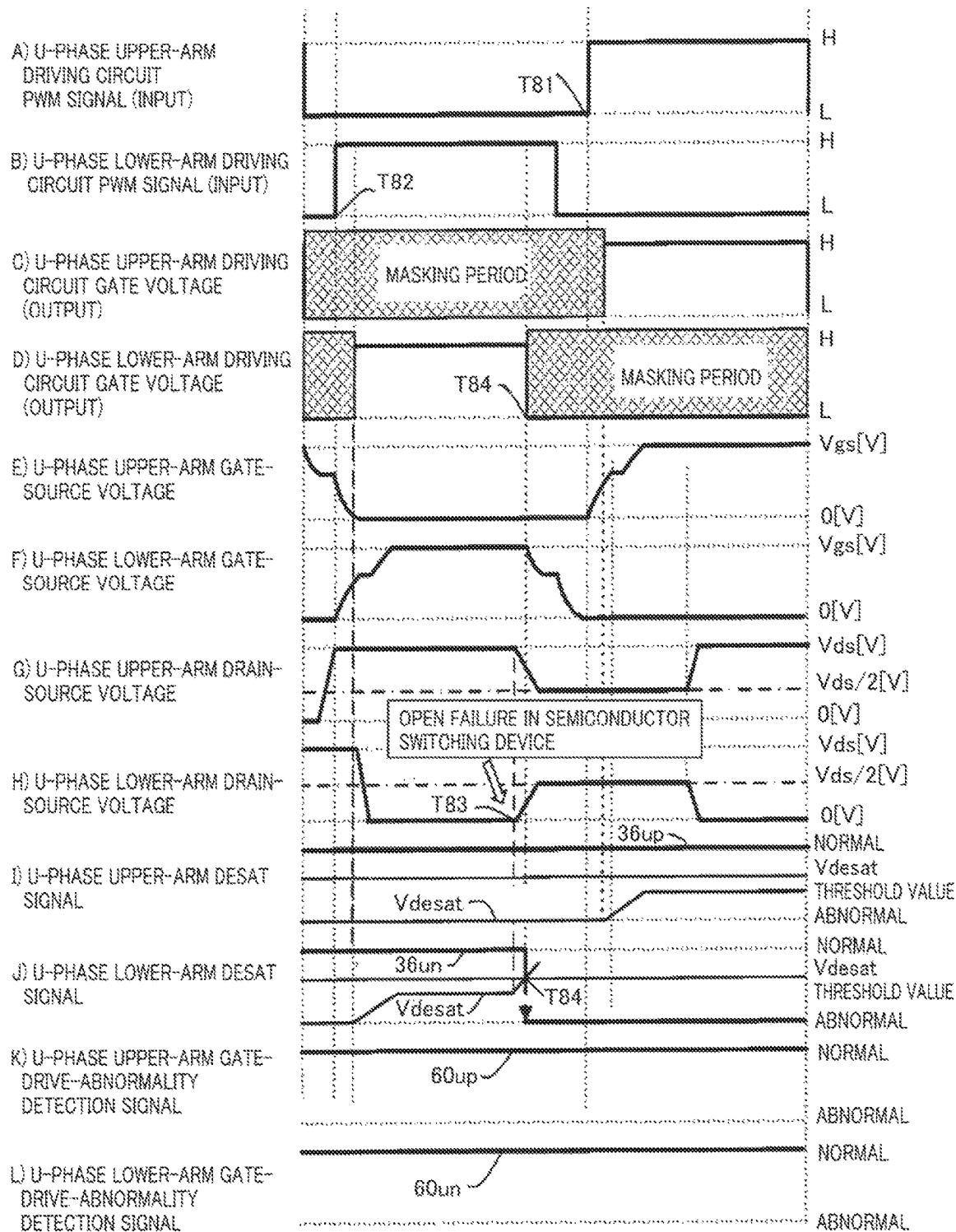
FIG. 8 is a waveform chart representing the operation at a time when an open failure occurs in the U-phase lower arm in the electric-power conversion apparatus according to Embodiment 1.

Next, there will be explained the case where the semiconductor switching device of one of the upper arm and the lower arm has a short-circuit failure. FIG. 8 is a waveform chart representing the operation at a time when an open failure occurs in the U-phase lower arm in the electric-power conversion apparatus according to Embodiment 1. In FIG. 8, the abscissa denotes the time, and A) through L) in the ordinate are respective voltage waveforms or signal waveforms corresponding to A) through L) in FIG. 5.

In FIG. 8, at a time point T81, the level of the U-phase upper-arm PWM control signal PWM-up represented in A) rises from the L level to the H level; at the time point T81, in response to the rise, the gate voltage of the U-phase upper-arm driving circuit 61, represented in C), rises from the L level to the H level. In contrast, at a time point T82, the level of the U-phase lower-arm PWM control signal PWM-un represented in B) rises from the L level to the H level; in response to the rise, the gate voltage of the U-phase lower-arm driving circuit 62, represented in D), rises at the time point T82.

In this situation, as represented in H), when at a time point T83, an open failure occurs in the U-phase lower-arm semiconductor switching device Qun, the drain-source voltage of the U-phase lower-arm semiconductor switching device Qun increases from the time point T83 and then reaches Vds/2 [V]. Because the U-phase lower-arm semiconductor switching device Qun has the open failure, the DESAT detection unit as the U-phase lower-arm excessive-current detection means 50 charges only the capacitor 14. In this situation, the DESAT voltage Vdesat of the U-phase lower-arm driving circuit 62 reaches the Vdesat threshold value at a time point T84.

As a result, at the time point T84, the U-phase lower-arm DESAT signal 36un represented in J) changes from "normal" to "abnormal".

In contrast, none of the DESAT voltage Vdesat of the U-phase upper-arm driving circuit 61, represented in I), the gate-source voltage of the U-phase upper-arm driving circuit 61, represented in E), and the gate-source voltage of the U-phase lower-arm driving circuit 62, represented in F), becomes abnormal; thus, both the U-phase upper-arm gate-drive-abnormality detection signal 60up represented in K) and the U-phase lower-arm gate-drive-abnormality detection signal 60un represented in L) continuously indicate a normality.

The foregoing explanation is made for the case where the U-phase lower-arm semiconductor switching device has an open failure; however, similar operation is performed either in the case where the U-phase upper-arm semiconductor switching device has an open failure or in the case where the V phase or the w phase has an open failure, in accordance with each of the cases.

As described above, when the semiconductor switching device of any one of the upper arm and the lower arm has a short-circuit failure, the DESAT signal in the arm opposite to the arm where the short-circuit failure exists becomes abnormal; when the semiconductor switching device of any one of the upper arm and the lower arm has an open failure, the DESAT signal in the arm where the open failure exists becomes abnormal.

Accordingly, in the case where the DESAT signal of any one of the upper arm and the lower arm indicates an abnormality, a short-circuit failure or an open failure in the upper-arm and lower-arm semiconductor switching devices can be determined; thus, a secondary failure caused by short-circuiting between the upper arm and the lower arm or the like can be prevented by performing the three-phase short-circuit control of the arm opposite to the arm where the DESAT signal indicates an abnormality.

As described in the foregoing items (1), (2), and (3), through the combination of the upper-arm or the lower-arm gate-drive-abnormality detection signal and the upper-arm or the lower-arm DESAT signal, it can logically be determined whether the three-phase short-circuit control should be applied to the upper-arm or the lower-arm; thus, even hardware can realize the three-phase short-circuit control.

In addition, in the case where in the combination, of the gate-drive-abnormality detection signal and the DESAT signal, that is other than each of the foregoing cases (1), (2), and (3), both the upper-arm and lower arm gate-drive-abnormality detection signals are abnormal, both the upper arm and the lower arm in each of the legs consisting of the upper arm and the lower arm of the three phases cannot be gate-driven; thus, it can be determined that the three-phase short-circuit control cannot be performed. In this case, all-phase shutoff control is performed.

Moreover, in the case where both the upper-arm and lower arm DESAT signals are abnormal, it can be determined that gate driving of each of the upper arm and the lower arm is normal for the PWM control signal, which is an input signal for the driving circuit; thus, it can be determined that Hi fixation is caused by the PWM control signal 10 between the driving circuit and the MICON. In such cases, it can be presumed that the semiconductor switching device is normal; although in Embodiment 1, the three-phase short-circuit control is applied to the lower arm, it may be allowed that the three-phase short-circuit control is applied to any one of the upper arm and the lower arm.

In the electric-power conversion apparatus according to Embodiment 1, based on the combination of the abnormality determination on gate driving and the DESAT signal, it can be determined that a short-circuit failure or an open failure exists in any one of the upper arm and the lower arm; thus, unlike the conventional technology, it is not required to monitor the phase current by means of software processing utilizing a MICON. As a result, because even when an abnormality occurs in the electric-power conversion circuit, the three-phase short-circuit control can be realized by a hardware configuration, there can be shortened the time in which the electric-power conversion apparatus transits to a state where it operates to make the vehicle come into the evading-drive state.

Accordingly, unlike the conventional technology, it is not required to monitor phase-current imbalance by use of a current sensor, and it is made possible to perform the three-phase short-circuit control by use of a hardware configuration, while evading a secondary failure caused by a short-circuit between the upper arm and the lower arm or the like; therefore, it is made possible to make the vehicle rapidly transit the evading-drive state.

Moreover, there is required neither addition of a dedicated MICON for improving the responsiveness of the three-phase short-circuit control nor designing (upsizing) of the bus-bar shape in which a phase current offset is added; thus, the cost can further be suppressed from increasing.

Moreover, it is not required to consider the offset caused by the phase-current imbalance; thus, it is not required to expand the monitoring range of the current sensor. Therefore, the resolution and the accuracy of the sensor can be improved.

Furthermore, the three-phase short-circuit control can be realized by an inexpensive circuit configuration including a universal logic circuit, a resistor, a diode, a transistor, and the like, without intermediary of software.

In addition, although in Embodiment 1, as an excessive-current detection means, the DESAT detection method has been explained, it can be expected that the current sensing method (OC) has the same effect.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the cases where at least one constituent element is modified, added, or omitted.

Next, the features of the electric-power conversion apparatus disclosed in the present disclosure will be described as appendixes, hereinafter.

(Appendix 1) An electric-power conversion apparatus comprising:
an electric-power conversion circuit in which
two or more series circuits in each of which an upper-arm semiconductor switching device and a lower-arm semiconductor switching device are connected in series with each other are connected in parallel with one another,
parallel connection portions of the two or more series circuits are connected with a DC power source,
a series connection portion between the upper-arm semiconductor switching device and the lower-arm semiconductor switching device in each of the two or more series circuits is connected with an armature winding of an AC motor, and
electric-power conversion between the DC power source and the AC motor is performed through switching control of the respective upper-arm semiconductor switching devices and lower-arm semiconductor switching devices in the two or more series circuits;
a driving circuit that provides gate driving signals to the upper-arm semiconductor switching device and the lower-arm semiconductor switching device so as to perform the switching control;
a short-circuit control means that performs short-circuit control of the electric-power conversion circuit by turning on all the semiconductor switching devices in any one of the upper arm and the lower arm;
an excessive-current detection means that detects whether or not an abnormality caused by an excessive current exists in the upper-arm semiconductor switching device and/or the lower-arm semiconductor switching device; and
a gate-drive-abnormality detection means that detects whether or not a gate-voltage abnormality exists in the upper-arm semiconductor switching device and/or the lower-arm semiconductor switching device, and
wherein based on a result of the abnormality detection by the excessive-current detection means and a result of the abnormality detection by the gate-drive-abnormality detection means, the short-circuit control means turns on all the semiconductor switching devices in any one of the upper arm and the lower arm so as to perform the short-circuit control.

(Appendix 2) The electric-power conversion apparatus according to (Appendix 1), wherein when the result of detection by the excessive-current detection means indicates that an abnormality exists in the upper-arm semiconductor switching device and/or the lower-arm semiconductor switching device and the result of detection by the gate-drive-abnormality detection means indicates that an abnormality exists in the upper-arm semiconductor switching device or the lower-arm semiconductor switching device, the short-circuit control means applies the short-circuit control to the semiconductor switching devices of the arm where an abnormality has been detected by the gate-drive-abnormality detection means.

(Appendix 3) The electric-power conversion apparatus according to (Appendix 1), wherein when only the result of detection by the gate-drive-abnormality detection means indicates an abnormality, the short-circuit control means applies the short-circuit control to the semiconductor switching devices of the arm opposite to the arm where the abnormality has been detected by the gate-drive-abnormality detection means.

(Appendix 4) The electric-power conversion apparatus according to (Appendix 1), wherein when only the result of detection by the excessive-current detection means indicates an abnormality, the short-circuit control means applies the short-circuit control to the semiconductor switching devices of the arm opposite to the arm where the abnormality has been detected by the excessive-current detection means.

(Appendix 5) The electric-power conversion apparatus according to any one of (Appendix 1) through (Appendix 4), wherein the short-circuit control means is formed of hardware.

(Appendix 6) The electric-power conversion apparatus according to any one of (Appendix 1) through (Appendix 5), wherein the driving circuit is provided with at least one of the gate-drive-abnormality detection means and the excessive-current detection means.

What is claimed is:
1. An electric-power conversion apparatus comprising:
an electric-power conversion circuit in which
two or more series circuits in each of which an upper-arm semiconductor switching device and a lower-arm semiconductor switching device are connected in series with each other are connected in parallel with one another,
parallel connection portions of the two or more series circuits are connected with a DC power source,
a series connection portion between the upper-arm semiconductor switching device and the lower-arm semiconductor switching device in each of the two or more series circuits is connected with an armature winding of an AC motor, and
electric-power conversion between the DC power source and the AC motor is performed through switching control of the respective upper-arm semiconductor switching devices and lower-arm semiconductor switching devices in the two or more series circuits;
a driving circuit that provides gate driving signals to the upper-arm semiconductor switching device and the lower-arm semiconductor switching device so as to perform the switching control;
a short-circuit controller that performs short-circuit control of the electric-power conversion circuit by turning on all the semiconductor switching devices in any one of the upper arm and the lower arm;
an excessive-current detector that detects whether or not an abnormality caused by an excessive current exists in the upper-arm semiconductor switching device and/or the lower-arm semiconductor switching device; and
a gate-drive-abnormality detector that detects whether or not a gate-voltage abnormality exists in the upper-arm semiconductor switching device and/or the lower-arm semiconductor switching device, and
wherein based on a result of the abnormality detection by the excessive-current detector and a result of the abnormality detection by the gate-drive-abnormality detec- tor, the short-circuit controller turns on all the semiconductor switching devices in any one of the upper arm and the lower arm so as to perform the short-circuit control.

2. The electric-power conversion apparatus according to claim 1, wherein when the result of detection by the excessive-current detector indicates that an abnormality exists in the upper-arm semiconductor switching device and/or the lower-arm semiconductor switching device and the result of detection by the gate-drive-abnormality detector indicates that an abnormality exists in the upper-arm semiconductor switching device or the lower-arm semiconductor switching device, the short-circuit controller applies the short-circuit control to the semiconductor switching devices of the arm where an abnormality has been detected by the gate-drive-abnormality detector.

3. The electric-power conversion apparatus according to claim 2, wherein the short-circuit controller is formed of hardware.

4. The electric-power conversion apparatus according to claim 3, wherein the driving circuit is provided with at least one of the gate-drive-abnormality detector and the excessive-current detector.

5. The electric-power conversion apparatus according to claim 2, wherein the driving circuit is provided with at least one of the gate-drive-abnormality detector and the excessive-current detector.

6. The electric-power conversion apparatus according to claim 1, wherein when only the result of detection by the gate-drive-abnormality detector indicates an abnormality, the short-circuit controller applies the short-circuit control to the semiconductor switching devices of the arm opposite to the arm where the abnormality has been detected by the gate-drive-abnormality detector.

7. The electric-power conversion apparatus according to claim 6, wherein the short-circuit controller is formed of hardware.

8. The electric-power conversion apparatus according to claim 7, wherein the driving circuit is provided with at least one of the gate-drive-abnormality detector and the excessive-current detector.

9. The electric-power conversion apparatus according to claim 6, wherein the driving circuit is provided with at least one of the gate-drive-abnormality detector and the excessive-current detector.

10. The electric-power conversion apparatus according to claim 1, wherein when only the result of detection by the excessive-current detector indicates an abnormality, the short-circuit controller applies the short-circuit control to the semiconductor switching devices of the arm opposite to the arm where the abnormality has been detected by the excessive-current detector.

11. The electric-power conversion apparatus according to claim 10, wherein the short-circuit controller is formed of hardware.

12. The electric-power conversion apparatus according to claim 11, wherein the driving circuit is provided with at least one of the gate-drive-abnormality detector and the excessive-current detector.

13. The electric-power conversion apparatus according to claim 10, wherein the driving circuit is provided with at least one of the gate-drive-abnormality detector and the excessive-current detector.

14. The electric-power conversion apparatus according to claim 1, wherein the short-circuit controller is formed of hardware.

15. The electric-power conversion apparatus according to claim 14, wherein the driving circuit is provided with at least one of the gate-drive-abnormality detector and the excessive-current detector.

16. The electric-power conversion apparatus according to claim 1, wherein the driving circuit is provided with at least one of the gate-drive-abnormality detector and the excessive-current detector.

* * * * *